United States Patent
Kim et al.

(10) Patent No.: US 10,172,181 B2
(45) Date of Patent: Jan. 1, 2019

(54) APPARATUS AND METHOD OF TRANSMITTING/RECEIVING SIGNALS IN MOBILE COMMUNICATION SYSTEM SUPPORTING CARRIES

(71) Applicant: Samsung Electronics Co., Ltd., Suwon-si, Gyeonggi-do (KR)

(72) Inventors: Soenghun Kim, Suwon-si (KR); Sangbum Kim, Suwon-si (KR); Jaehyuk Jang, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 14/712,231

(22) Filed: May 14, 2015

(65) Prior Publication Data

US 2015/0334769 A1 Nov. 19, 2015

(30) Foreign Application Priority Data

May 16, 2014 (KR) .................. 10-2014-0059113

(51) Int. Cl.
*H04W 76/00* (2018.01)
*H04W 88/06* (2009.01)
(Continued)

(52) U.S. Cl.
CPC ........... *H04W 76/27* (2018.02); *H04W 16/32* (2013.01); *H04W 24/02* (2013.01); *H04W 36/36* (2013.01); *H04W 88/06* (2013.01)

(58) Field of Classification Search
CPC ... H04W 76/046; H04W 88/06; H04W 16/32; H04W 24/02
See application file for complete search history.

(56) References Cited

U.S. PATENT DOCUMENTS

2009/0072366 A1 3/2009 Govindaiah et al.
2013/0315114 A1 11/2013 Seo et al.
(Continued)

FOREIGN PATENT DOCUMENTS

CN 101677282 A 3/2010
EP 2635082 A1 9/2013
(Continued)

OTHER PUBLICATIONS

Samsung, Discussion on MAC functions in dual MAC, 3GPP TSG-RAN WG2#85 bis, 3GPP, R2-141404, Apr. 1, 2014.
(Continued)

*Primary Examiner* — Kent K Krueger
(74) *Attorney, Agent, or Firm* — Jefferson IP Law, LLP

(57) ABSTRACT

The disclosure relates to methods and systems for converging a 5th-Generation (5G) communication system with technology for Internet of Things (IoT). The disclosure is applicable to intelligent services based on 5G communication and IoT-related technologies. A method for configuring a connection by a terminal is provided, which includes receiving a radio resource control (RRC) message from a base station, determining whether semi-persistent scheduling (SPS) and transmission time interval (TTI) bundling are configured based on the RRC message, determining whether dual connectivity is configured, if the SPS and the TTI bundling are configured, determining whether the TTI bundling is configured for master cell group (MCG) and the SPS is configured for secondary cell group (SCG), if the dual connectivity is configured, and configuring an RRC connection based on the RRC message, if the TTI bundling is configured for the MCG and the SPS is configured for the SCG.

16 Claims, 24 Drawing Sheets

(51) Int. Cl.
*H04W 76/27* (2018.01)
*H04W 36/36* (2009.01)
*H04W 16/32* (2009.01)
*H04W 24/02* (2009.01)

(56) References Cited

U.S. PATENT DOCUMENTS

| | | |
|---|---|---|
| 2014/0040694 A1 | 2/2014 | Verma et al. |
| 2014/0192740 A1* | 7/2014 | Ekpenyong ............ H04L 5/0094 370/329 |
| 2014/0241319 A1 | 8/2014 | Lee et al. |
| 2015/0005555 A1 | 2/2015 | Takahashi et al. |
| 2015/0055556 A1 | 2/2015 | Takahashi et al. |

FOREIGN PATENT DOCUMENTS

| | | |
|---|---|---|
| EP | 2830379 A1 | 1/2015 |
| WO | 2013/048056 A1 | 4/2013 |
| WO | 2013-141269 A1 | 9/2013 |
| WO | 2013/169173 A1 | 11/2013 |

OTHER PUBLICATIONS

Qualcomm Incorporated, SPS and TTI bundling for dual connectivity, 3GPP TSG-RAN WG2♯85bis, 3GPP, R2-141684, Apr. 4, 2014.

Qualcomm Incorporated: SPS and TTI bundling for dual connectivity, 3GPP Draft' R2-141684_Dual_Connectivity_SPS 85bis, 3rd Generation Partnership Project (3GPP), Mobile Competence Centre; 650, Route Des Lucioles ; F-06921 Sophia-Antipolis Cedex ; France, vol. RAN WG2, No. Valencia, ES; Mar. 31, 2014-Apr. 4, 2014 Mar. 22, 2014 (Mar. 22, 2014), XP050792818; R2-141684; Valencia, ES; Mar. 22, 2014.

Ericsson: Modelling of MAC for dual connectivity, 3GPP Draft; R2-141547—Modelling of MAC for User Plane Aggregation, 3rd Generation Partnership Project (3GPP), Mobile Competence Centre ; 650, Route Des Lucioles ; F-06921 Sophia-Antipolis Cedex ; FR vol. RAN WG2, No. Valencia, Spain;Mar. 31, 2014-Apr. 4, 2014 Mar. 22, 2014 (Mar. 22, 2014), XP050792707; R2-141547 Valencia, ES; Mar. 22, 2014.

NTT DOCOMO, Inc., Support of PUCCH on SCell for CA—RAN2 aspects[online], 3GPP TSG-RAN WG2♯86, 3GPP, R2-141967; Seoul, KR; May 10, 2014.

Huawei, HiSilicon, Discussion on HARQ RTT Timer in TDD-FDD CA[online] , 3GPP TSG-RAN WG2♯86, 3GPP, May 10, 2014, R2-142687; Seoul, KR; May 10, 2014.

Chinese Office Action dated Jul. 25, 2018, issued in Chinese Patent Application No. 201580000166.6.

* cited by examiner

APPARATUS AND METHOD OF TRANSMITTING/RECEIVING SIGNALS IN MOBILE COMMUNICATION SYSTEM SUPPORTING CARRIES

CROSS-REFERENCE TO RELATED APPLICATION(S)

This application claims the benefit under 35 U.S.C. § 119(a) of a Korean patent application filed on May 16, 2014 in the Korean Intellectual Property Office and assigned Serial number 10-2014-0059113, the entire disclosure of which is hereby incorporated by reference.

TECHNICAL FIELD

The present disclosure relates to transmission/reception of signals in a mobile communication system. More particularly, the present disclosure relates to an apparatus and method of transmitting/receiving signals in a mobile communication system supporting a plurality of carriers.

BACKGROUND

Mobile communication systems have been developed to provide a communication service to users while they are moving. With the rapid development of technology, mobile communication systems have been developed to provide data communication services at a high speed as well as voice communication.

In recent years, Long Term Evolution (LTE) that has been developed as a next generation mobile communication system is in process of standardization by the $3^{rd}$ Generation Partnership Project (3GPP). LTE is a technology to implement high speed packet-based communication with a transmission rate of maximum 100 Mbps higher than the data transmission rate on current technology.

Recently, serious discussions have been made on LTE-Advanced (LTE-A) that enhances the transmission rate by adding various new technologies to LTE communication systems. One of the technologies to be introduced is Carrier Aggregation (CA) as a typical example. CA refers to a technology that allows one user equipment (UE) device to use a plurality of forward carriers and a plurality of reverse carries in data communication, compared to the related art where one UE device uses only one forward carrier and one reverse carrier.

In LTE-A of the related art, only intra-evolved Node B (eNB) CA has been defined. This leads to reduce the applicability of CA functions. Particularly, in order to establish a scenario operating a plurality of pico cells and one micro cell in multiplexing, the LTE-A definition according to the related art cannot aggregate a macro cell and pico cells.

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also referred to as a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-Shift Keying (FSK) and Feher's Quadrature Amplitude Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method of transmitting/receiving signals in a mobile communication system supporting a plurality of carriers.

Another aspect of the present disclosure is to provide an apparatus and method of transmitting/receiving signals based on inter-evolved Node B (eNB) carrier aggregation (CA) in a mobile communication system supporting a plurality of carriers.

In accordance with an aspect of the present disclosure, a method for configuring a connection by a terminal is provided. The method includes receiving a radio resource control (RRC) message from a base station, determining whether semi-persistent scheduling (SPS) and transmission time interval (TTI) bundling are configured based on the RRC message, determining whether dual connectivity is configured, if the SPS and the TTI bundling are configured, determining whether the TTI bundling is configured for master cell group (MCG) and the SPS is configured for secondary cell group (SCG), if the dual connectivity is configured, and configuring an RRC connection based on the RRC message, if the TTI bundling is configured for the MCG and the SPS is configured for the SCG.

In accordance with another aspect of the present disclosure, a terminal for configuring a connection is provided. The terminal includes a transceiver configured to at least one of transmit or receive a signal, and a controller configured to receive an RRC message from a base station, to determine whether SPS and TTI bundling are configured based on the RRC message, to determine whether dual connectivity is configured, if the SPS and the TTI bundling are configured, to determine whether the TTI bundling is configured for MCG and the SPS is configured for SCG, if the dual connectivity is configured, and to configure an RRC connection based on the RRC message, if the TTI bundling is configured for the MCG and the SPS is configured for the SCG.

In accordance with another aspect of the present disclosure, a method for configuring a connection by a base station is provided. The method includes determining to configure TTI bundling for a terminal on primary serving cell (PCell), determining whether SPS is configured for the terminal, determining whether the SPS is configured on the PCell or primary secondary serving cell (PSCell), if the SPS is configured for the terminal, generating an RRC message indicating configuration of the TTI bundling on the PCell, if the SPS is configured on PSCell, and transmitting the RRC message to the terminal.

In accordance with another aspect of the present disclosure, a base station for configuring a connection is provided. The base station includes a transceiver configured to at least one of transmit or receive a signal, and a controller configured to determining to configure TTI bundling for a terminal on PCell, to determine whether SPS is configured for the terminal, to determine whether the SPS is configured on the PCell or PSCell, if the SPS is configured for the terminal, to generate an RRC message indicating configuration of the TTI bundling on the PCell, if the SPS is configured on PSCell, and transmit the RRC message to the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
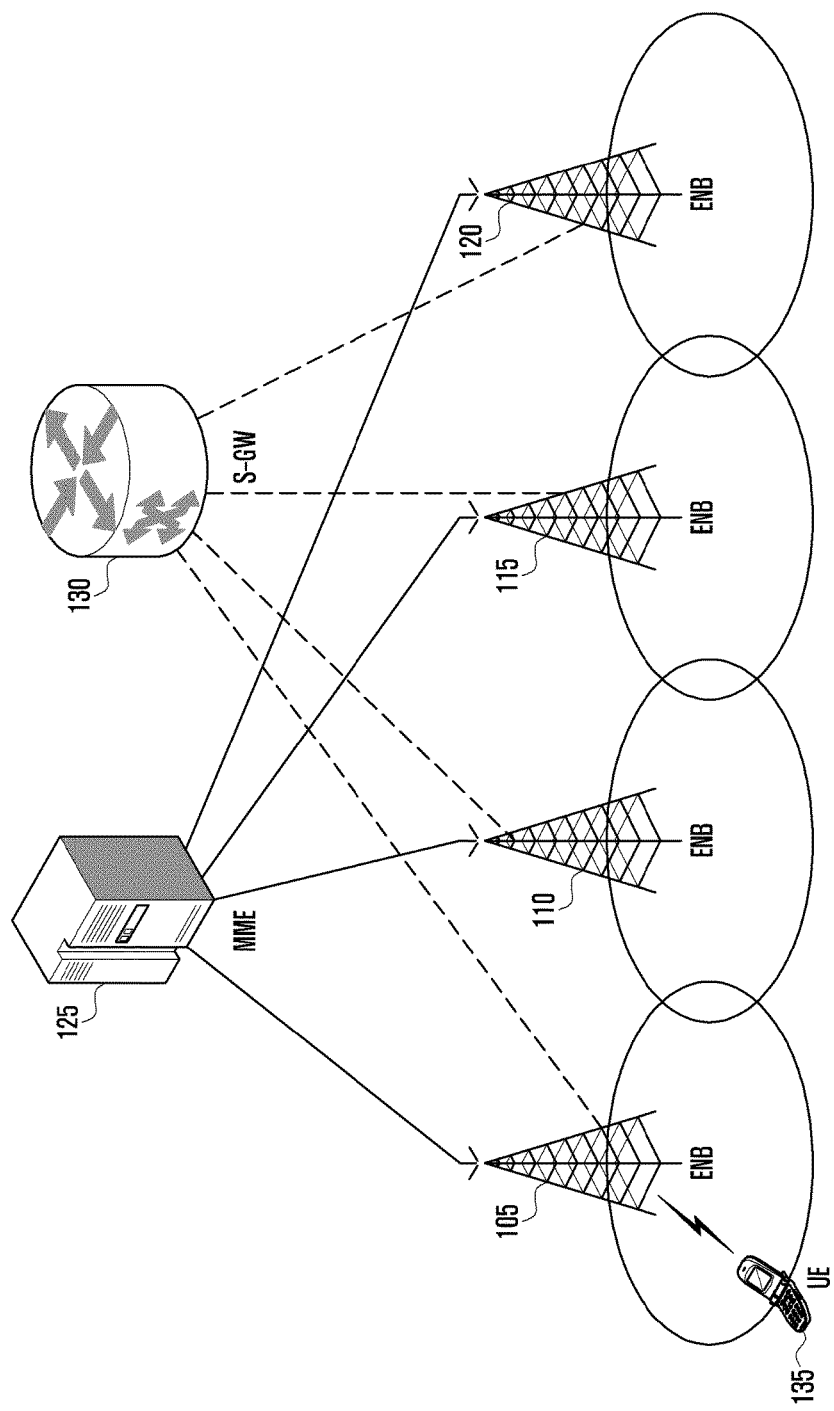
FIG. 1 is a diagram of a configuration of a Long Term Evolution (LTE) system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be easily appreciated to those skilled in the art that various modifications, additions and substitutions are possible from the embodiment of the present disclosure, and the scope of the present disclosure should not be limited to the following embodiments. The various embodiments of the present disclosure are provided such that those skilled in the art completely understand the present disclosure.

In the present disclosure, expressions including ordinal numbers, such as "first," "second," etc., and/or the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them the first user device and the second user device are user devices. For example, a first element could be termed a second element, and similarly, a second element could be also termed a first element without departing from the scope of the present disclosure. The expression "and/or" includes any and all combinations of the associated listed words. For example, the expression "A and/or B" may include A, may include B, or may include both A and B.

The terms used in the present disclosure are only used to describe specific various embodiments, and are not intended to limit the present disclosure. The expressions such as "include" and "may include" which may be used in the present disclosure denote the presence of the disclosed functions, operations, and constituent elements and do not limit one or more additional functions, operations, and constituent elements. In the present disclosure, the terms such as ""include" and/or" "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

An embodiment of the present disclosure provides an apparatus and method of transmitting/receiving signals in a mobile communication system supporting a plurality of carriers.

In addition, an embodiment of the present disclosure provides an apparatus and method of transmitting/receiving signals based on inter-evolved Node B (eNB) carrier aggregation (CA) in a mobile communication system supporting a plurality of carriers.

The apparatus and method according to an embodiment of the present disclosure may be applied to various communication systems: for example, Long-Term Evolution (LTE), LTE-Advanced (LTE-A), high speed downlink packet access (HSDPA), high speed uplink packet access (HSUPA), high rate packet data (HRPD) of $3^{rd}$ generation project partnership 2 (3GPP2), Wideband Code Division Multiple Access (WCDMA) of 3GPP2, CDMA of 3GPP2, Institute of Electrical and Electronics Engineers (IEEE) 802.16m communication system, Evolved Packet System (EPS), Mobile Internet Protocol (Mobile IP) system, etc.

The LTE system according to various embodiments of the present disclosure is described referring to FIG. 1.

FIG. 1 is a diagram of a configuration of an LTE system according to various embodiments of the present disclosure.

Referring to FIG. 1, the LTE system configures the wireless access network, including eNBs 105, 110, 115, and 120, a Mobility Management Entity (MME) 125, and a Serving-Gateway (S-GW) 130. User equipment (UE) 135 is connected to an external network via eNBs 105, 110, 115 and 120 and S-GW 130. eNBs 105, 110, 115 and 120 correspond to Node B of the Universal Mobile Telecommunication System (UMTS) according to the related art. eNBs 105 to 120 are connected to UE 135 via wireless channels, performing more complicated functions than Node B of the related art.

In LTE system, since real-time Voice over IP (VoIP) services and all user traffics are supported via shared channels, devices are required to collect information regarding states, such as buffer states of UE, available transmission power states, channel states, etc., and to make a schedule. These tasks are performed via eNBs 105 to 120. One eNB 105, 110, 115 or 120 controls a plurality of cells. In order to implement a transmission rate of 100 Mbps, LTE systems employ Orthogonal Frequency Division Multiplexing (OFDM) as a wireless access technology, at a bandwidth of 20 Mhz. LTE systems also employ Adaptive Modulation &

Coding (AMC) to determine modulation scheme and channel coding rate, meeting with the channel state of UE 135.

S-GW 130 is a device that provides data bearers. S-GW 130 forms or removes data bearers according to the control of MME 125. MME 125 manages the mobility of UE 135 and controls a variety of functions. MME 125 connects to a plurality of eNBs. In the following description, a radio protocol stack used in an LTE system according to various embodiments of the present disclosure is explained referring to FIG. 2.

Figure 2:
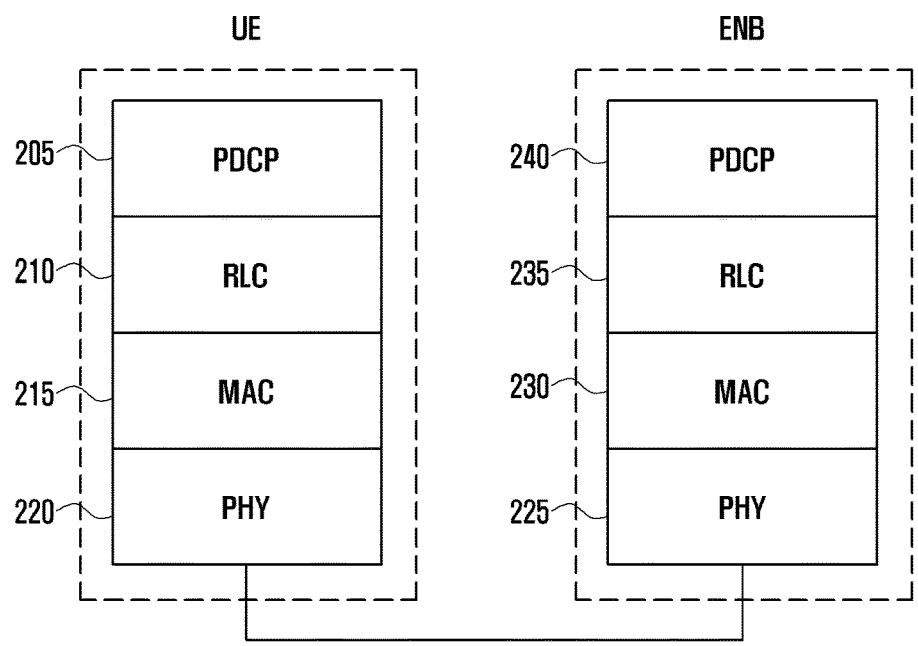
FIG. 2 is a diagram of a radio protocol stack in an LTE system according to various embodiments of the present disclosure.

FIG. 2 is a diagram of a radio protocol stack in an LTE system according to various embodiments of the present disclosure.

Referring to FIG. 2, in the radio protocol of an LTE system, the radio protocol between UE and eNB includes various layers, namely Packet Data Convergence Protocol (PDCP) layers 205 and 240, Radio Link Control (RLC) layers 210 and 235, Medium Access Control (MAC) layer 215 and 230, Physical layers (PHY) 220 and 225, respectively.

PDCP layers 205 and 240 perform compression/decompression of IP header. RLC layers 210 and 235 reconfigure PDCP packet data unit (PDU) in proper size and perform Automatic Repeat reQuest (ARQ).

MAC layers 215 and 230 connect to a number of RLC layer devices included in one UE device. MAC 215 and 230 layers multiplex RLC PDUs to MAC PDU and de-multiplex RLC PDUs from MAC PDU. PHY layers 220 and 225 channel-code and modulate data from the upper layers, create OFDM symbols, and transmit the symbols via a radio channel. In addition, PHY layers 220 and 225 demodulate and channel-decode OFDM symbols transmitted via a radio channel, and transfer the symbols to the upper layers.

In the following description, an intra-eNB CA in an LTE system according to various embodiments of the present disclosure is explained referring to FIG. 3.

Figure 3:
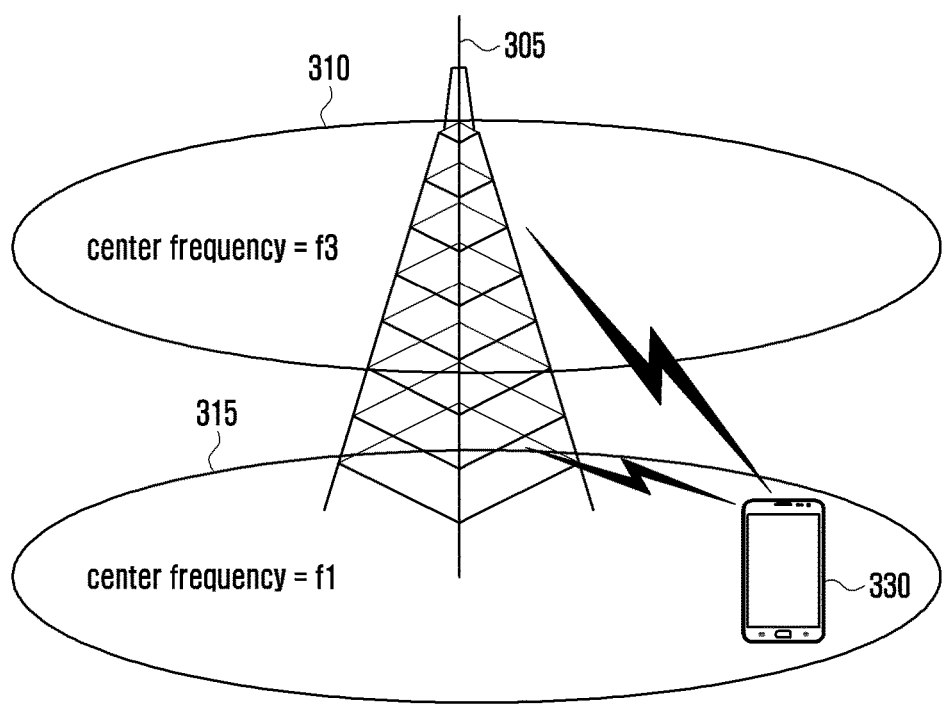
FIG. 3 is a diagram that describes an intra-evolved Node B (eNB) carrier aggregation (CA) in an LTE system according to various embodiments of the present disclosure.

FIG. 3 is a diagram that describes an intra-eNB CA in an LTE system according to various embodiments of the present disclosure.

Referring to FIG. 3, one eNB broadcasts/receives multi-carriers over frequency bands. For example, when an eNB 305 broadcasts a forward carrier 315 of center frequency f1 and a forward carrier 310 of center frequency f3, the related art allows one UE device to transmit/receive data via one of the carriers 315 and 310.

However, UE 330 capable of performing CA can simultaneously transmit/receive data using a number of carriers. eNB 305 can allocate more carriers to UE 330 capable of performing CA according to the conditions, so that the UE 330 can increase the data transmission rate. As such, the process of aggregating uplink carriers and a forward carrier that one eNB broadcasts/receives is referred to as 'intra-eNB CA.' However, according to circumstances, in contrast with the embodiment of FIG. 3, a process may be needed for aggregating uplink carriers and forward carriers broadcast/received by eNBs that differ from each other.

In the following description, an inter-eNB CA in an LTE system according to various embodiments of the present disclosure is explained referring to FIG. 4.

Figure 4:
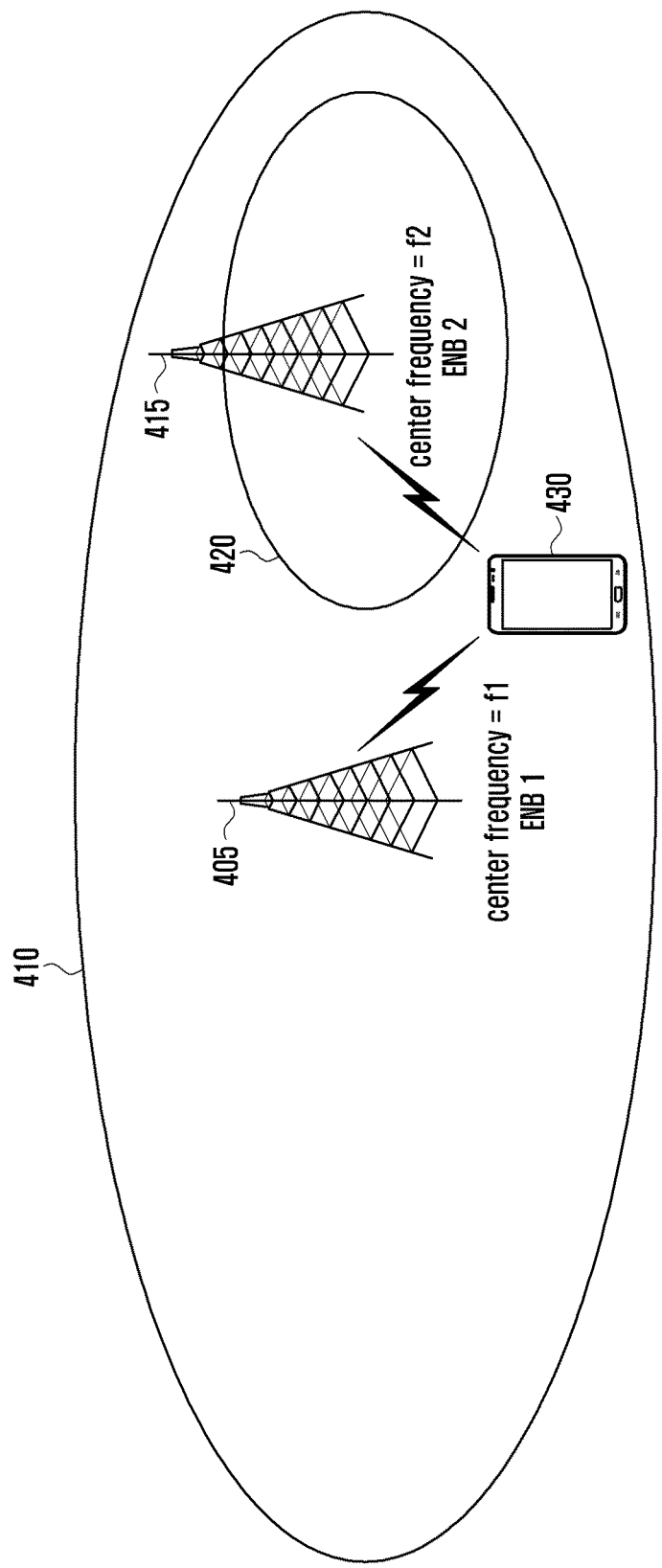
FIG. 4 is a diagram that describes an inter-eNB CA in an LTE system according to various embodiments of the present disclosure.

FIG. 4 is a diagram that describes an inter-eNB CA in an LTE system according to various embodiments of the present disclosure.

Referring to FIG. 4, eNB1 405 broadcasts/receives a carrier of center frequency f1 and eNB 2 415 broadcasts/receives a carrier of center frequency f2. When UE 430 aggregates the forward carrier of center frequency f1 and forward carrier of center frequency f2, this leads to a result that one UE device aggregates carriers that two or more eNBs broadcast/receive. This approach is called 'inter-eNB CA' in the various embodiments of the present disclosure. The 'inter-eNB CA' is also referred to as 'Dual Connectivity (DC)' in the various embodiments of the present disclosure. For example, configuration of DC may be used in the sense of configuration of: inter-eNB CA; one or more cell groups; Secondary Cell Group (SCG); at least one Secondary Cell under the control of an eNB that is not a serving eNB; primary SCell (pSCell); MAC entity for a serving eNB (SeNB); two MAC entities to UE; and so on.

In the following description, terms used in the present disclosure are explained.

In the context of configuration of cell, when one cell is configured with one forward carrier broadcast by one eNB and one uplink carrier received by the eNB, the term 'CA' may be used in the sense that UE simultaneously transmits/receives data through a number cells. In that case, the maximum transmission rate and the number of aggregated carriers are correlated positively.

In the following embodiments of the present disclosure, a 'process that UE receives data through a forward carrier or transmits data through a forward uplink carrier' is identical to a 'process that UE transmits/receive data using control channel and data channel provided by a cell corresponding to a center frequency and frequency band characterizing the carrier.' In the various embodiments of the present disclosure, 'CA' is used in the sense that 'a plurality of serving cells are configured,' in which the terms, Primary serving Cell (PCell) and Secondary serving Cell (SCell), or activated serving cell, etc., will be used. These terms have the same sense as used in LTE mobile communication system. In the various embodiments of the present disclosure, the term 'carrier,' 'component carrier,' 'serving cell,' etc. may be used in the same sense.

In the various embodiments of the present disclosure, a set of serving cells controlled by the same eNB is defined as a 'Cell Group' or 'Carrier Group' abbreviated as 'CG.' The CG is divided into 'Master Cell Group (MCG)' and 'Secondary Cell Group (SCG).'

The MCG is a set of serving cells that is controlled by an eNB controlling PCell, or Master eNB (MeNB). The SCG is a set of serving cells that is controlled by an eNB controlling only SCells, or Slave eNB (SeNB), not MeNB. eNB informs UE whether a specific serving cell is MCG or SCG in the process of configuring the serving cell.

One UE device may configure one MSG and one or more SCGs. For the sake of convenience, although the various embodiments of the present disclosure are described in such a way that one MSG and one SCG are configured in one UE device, it should be understood that the present disclosure is not limited to the embodiments. For example, the various embodiments of the present disclosure may be modified in such a way that one MSG and two SCGs are configured in one UE device. The terms 'PCell' and 'SCell' are used to differentiate types of serving cells. There are differences between PCell and SCell: for example, PCell remains an activated state and SCell repeats between activated and deactivated states according instructions of eNB. PCell serves as a primary serving cell that primarily controls mobility of UE, and SCell serves as a secondary serving cell that performs transmission/reception of data. In the various embodiments of the present disclosure, PCell and SCell are referred to as those defined in LTE specification 36.331 or 36.321, etc.

The various embodiments of the present disclosure consider the presence of macro cell and pico cell. The macro cell is a cell controlled by macro eNB and is available in a relatively wide area. The pico cell is a cell controlled by SeNB and is available in a much narrower area than the macro cell. For example, although it is not any strict standard differentiating between PCell and SCell, it may be assumed that a cell range of a macro cell has a radius of about 500 and a cell range of a pico cell has a range of tens of meters. In the various embodiments of the present disclosure, the terms a 'pico cell' and 'small cell' are used in the same sense.

Referring back to FIG. 4, when eNB1 is MeNB and eNB 2 is SeNB, the serving cell 410 of center frequency f1 is a serving cell that belongs to MCG and the serving cell 420 of center frequency f2 is a serving cell that belongs to SCG.

In the following description, for the sake of convenience, 'MCG' and 'SCG' may be called other terms, e.g., primary set and secondary set, primary carrier group and secondary carrier group, respectively. Although 'MCG' and 'SCG' are called other terms, it should be understood that their functions or operations are identical to those of other terms, respectively. The reasons of using these terms with different names are to differentiate which cell is controlled under an eNB controlling PCell of a specific UE device. According to whether or not a cell is controlled under an eNB controlling PCell of a specific UE device, the cell and the UE device may proceed with different procedures, respectively. For example, when a cell is controlled under an eNB controlling PCell of a specific UE device, the cell and the UE device may perform operations one mode, respectively; otherwise, the cell and the UE device may perform operations another mode. UE may configure one or more SCGs. For the sake of convenience, although the various embodiments of the present disclosure are described in such a way that one SCG is configured in UE, it should be understood that the present disclosure is not limited to the embodiments. For example, the various embodiments of the present disclosure may be modified in such a way that a number of SCGs are configured in UE and one of which has a particular attribute. In intra-eNB CA, UE transmits Channel State Information (CSI) and Hybrid ARQ (HARQ) for PCell through Physical Uplink Control Channel (PUCCH) of the PCell, along with CSI and HARQ for SCell through PUCCH of the PCell. This is to apply CA to UE that is unable to perform simultaneous transmission with Uplink.

In inter-eNB CA, it may be impossible to transmit CSI and HARQ of CSG SCells through PUCCH of PCell. Although HARQ needs to be transmitted within HARQ Round Trip Time (RTT), e.g., 8 ms, a transmission delay between MeNB and SeNB may be greater than the HARQ RTT. Therefore, one of the SCells that belonged to SCG is configured with a PUCCH transmission resource, and HARQ, CSI, etc., for SCG SCells are transmitted through the PUCCH. The specific SCell is called pSCell. In the following description, the inter-eNB CA and DC are used in the same sense.

In the following description, connection of a PDCP device in an LTE system according to various embodiments of the present disclosure is explained referring to FIG. 5.

Figure 5:
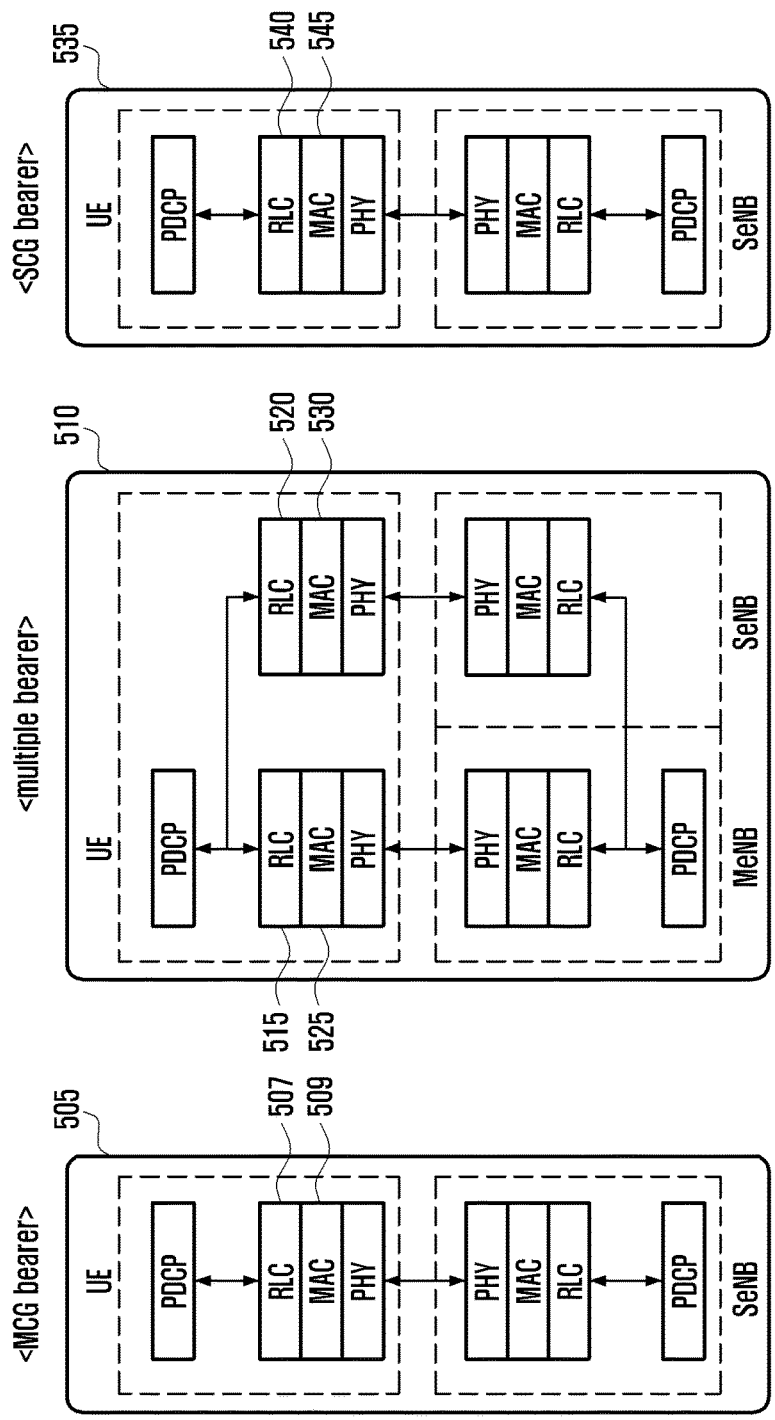
FIG. 5 is a diagram that describes connection of a Packet Data Convergence Protocol (PDCP) device in an LTE system according to various embodiments of the present disclosure.

FIG. 5 is a diagram that describes connection of a PDCP device in an LTE system according to various embodiments of the present disclosure.

Referring to FIG. 5, in general, one user service is supported by one Evolved Packet System (EPS) bearer and one EPS bearer is connected to one radio bearer. The radio bearer includes PDCP and RLC. In inter-eNB CA, RLC and PDCP of one bearer are located in different eNBs, thereby increasing the efficiency of data transmission/reception. To this end, different approaches are required according to types of user services.

For example, for a large amount of data, a user service may be supported in such a way that two RLCs are created and data is transmitted/received through both MeNB and SeNB as shown in diagram 510. For a high level of Quality of Service (QoS) such as Voice over LTE (VoLTE), a user service may be supported in such a way that an RLC is placed in only MeNB and data is transmitted/received though only the serving cell of MeNB as shown in diagram 505. As shown in diagram 535, a bearer may also be established to transmit/receive data through only serving cells of SeNBs.

In the following description, for the sake of convenience, a bearer transmitting/receiving data through only a serving sell of the MeNB as shown in diagram 505 is called an MCG bearer; a bearer as shown in diagram 510 is called a multiple bearer; and a bearer transmitting/receiving data through only a serving sell of the SeNB as shown in diagram 535 is called an SCG bearer. The PDCP in the MCG bear and SCG bearer is connected to one RLC. The PDCP in the multiple bearer is connected to two RLCs. RLCs that transmit/receive data through MCG (or that are connected to MAC related to serving cells of MCG) are called MCG RLCs 507 and 515. RLCs that transmit/receive data through SCG are called SCG RLCs 520 and 540. MACs 509 and 525 related to transmission/reception of data through MCG are called MCG-MAC. MACs 530 and 545 related to transmission/reception of data through SCG are called SCG-MAC. MAC and RLC are connected to each other with a logical channel. A logic channel between MCG RLC and MCG-MAC is called MCG logic channel. A logic channel between SCG RLC and SCG-MAC is called SCG logic channel. In the following description, it is assumed, for the sake of convenience, that: a macro cell area is an area where a small cell signal is not received and only macro cell signals are received; and a small cell area is an area where a macro cell signal and small cell signals are received. When a UE demanding a large amount of downlink data moves from a macro cell area to a small cell area, the UE may be additionally established with the small cell. Part of the bearers of UE that have a large amount of downlink data such as a File Transfer Protocol (FTP) bearer may be re-configured as a multiple bearer or a SCG bearer in the MCG bearer.

That is, when UE moves from a macro cell area to a small cell area and then from the small cell area to the macro cell, a bearer of the UE is configured from an MCG bearer to a multiple bearer/SCG bearer and then re-configured from the multiple bearer/SCG bearer to the MCG. In the following description, for the sake of convenience, a bearer transmits/receives: data through MCG when SCG/SeNB has not been configured; however, all or part of data through SCG when SCG/SeNB has been configured, and the bearer is called an 'offload bearer.' The bearer re-configuration may be performed when: SeNB is configured in UE (SeNB addition); SenB is released (SeNB release); or SeNB is changed (SeNB change). When SeNB is configured in UE (SeNB addition), the offload bearer is re-configured from an MCG bearer to an SCG bearer/multiple bearer. When SenB is released (SeNB release), the offload bearer is re-configured from an SCG bearer/multiple bearer to an MCG bearer. When SeNB is changed (SeNB change), the offload bearer is re-configured from an SCG bearer/multiple bearer to another SCG bearer/multiple bearer.

Embodiment 1

In the following description, it is assumed that UE is simultaneously connected to and communicates with a plurality of eNBs. It is also assumed that one bearer that an eNB has configured with UE can be divided for the plurality of eNBs. Under these circumstances, a method of adjusting an amount of data to be transmitted to the respective eNBs is provided as follows.

Figure 6:
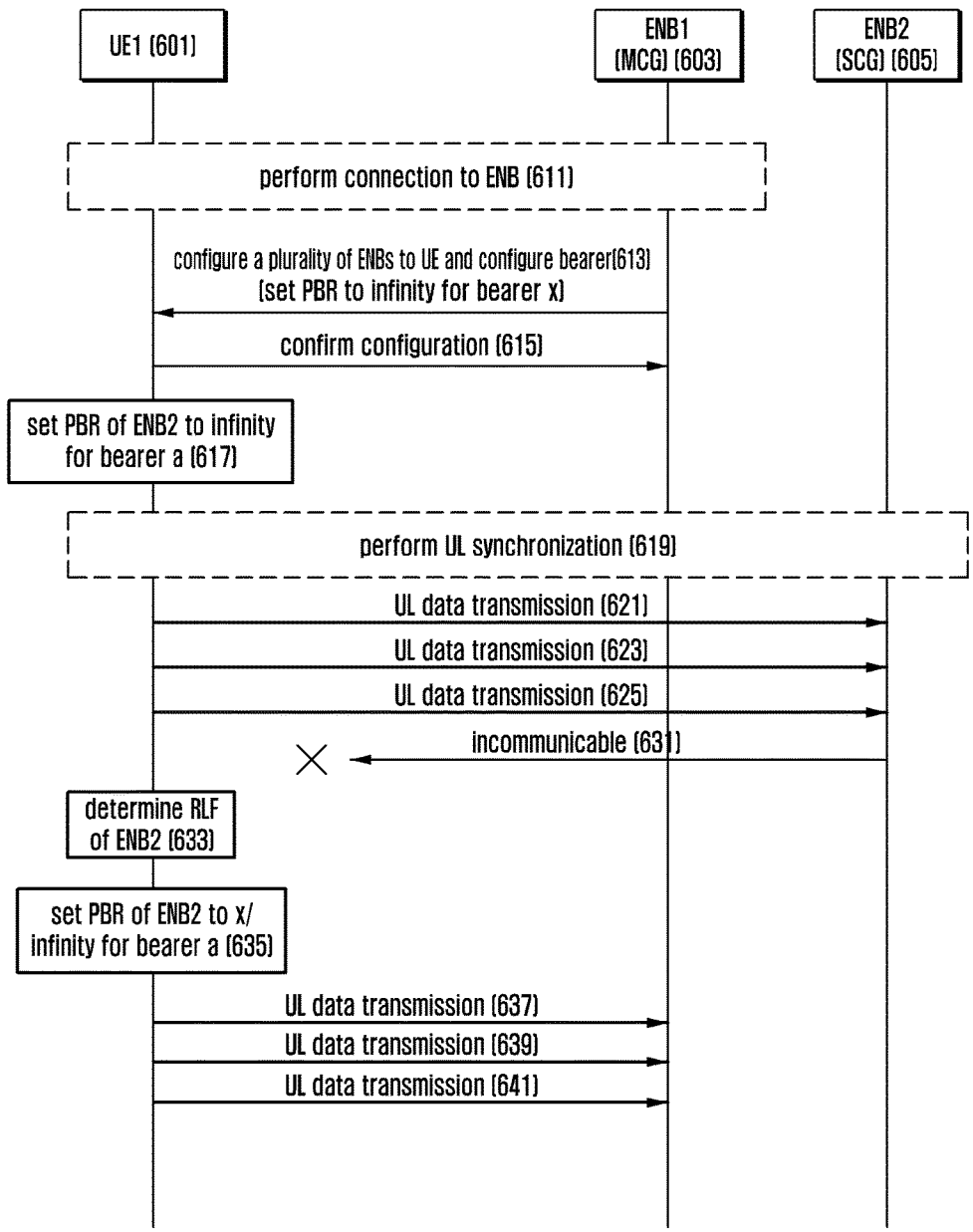
FIG. 6 is a signal flow chart that describes a process of establishing Prioritized Bit Rate (PBR) by user equipment (UE) that has established a multiple bearer in an LTE system according to a first embodiment of the present disclosure.

FIG. 6 is a signal flow chart that describes a process of establishing PBR by UE that has established a multiple bearer in an LTE system according to a first embodiment of the present disclosure. FIG. 6 is a flow chart that describes a logical channel prioritization procedure when supporting multiple connections according to the present disclosure.

Referring to FIG. 6, it is assumed that UE 601 is simultaneously connected to eNB1 603 and eNB2 605. To this end, it is assumed that UE has performed a connection procedure with eNB1 supporting multiple connections, through a procedure such as Random Access, etc. at operation 611. After the connection procedure, UE receives a configuration message for simultaneous communication with eNB2 from eNB1 at operation 613. The configuration message may be RRCConnectionReconfiguration that may include operation frequencies, cell identifiers, etc., of eNB1 and eNB2, which are used for simultaneous communication. The configuration message may also include configuration information about bearers that UE will use for data communication.

The UE may be configured with a plurality of bearers that may be used to transmit/receive different types of data, respectively. For example, a bearer X may be used for VoLTE data with a high order of priority, and a bearer Y may be used for general Internet communication with a low order of priority.

When UE transmits data using uplink resources allocated by eNB, it determines type of data to be transmitted, considering the orders of priority of logical channels allocated to respective bearers. When data lasts on a logical channel with a high order of priority, data on a logical channel with a low order of priority may not be processed for a relatively long time. This may cause a problem that it is impossible to transmit/receive at least amount of data to maintain a data session. In order to resolve the problem, a concept of Prioritized Bit Rate (PBR) is introduced. When a PBR is set to a logical channel, UE increases Bj by the PBR value each Transmission Time Interval (TTI) for the logical channel. After that, UE first takes the Bj into consideration to determine data to be transmitted. For example, although a logical channel X with a high order of priority has transmissible data, if the Bj of the logical channel X is zero, data on a logical channel that has a low order of priority and the Bj of which is not zero is first transmitted by the Bj. The PBRs are allocated to and managed by logical channels, respectively.

In the various embodiments of the present disclosure, it is assumed that uplink data that belonged to one bearer are separately transmitted to eNB1 and eNB2, and thus the PBR values are set to the respective eNBs 1 and 2. In the embodiment of FIG. 6, eNB1 (hereafter, called MCG 603) and eNB2 (hereafter, called SCG 605) are set with PBR values, respectively. In order to transmit traffic that is being transmitted through a specific bearer to SCG 605, the PBR value of the SCG 605 may be set to a relatively large value or infinity at operation 613.

When receiving the configuration message, UE transmits reception acknowledgement message at operation 615. The reception acknowledgement message may be RRCConnectionReconfigurationComplete. UE establishes respective bearers based on the configuration message received in operation 613 at operation 617. In the embodiment of FIG. 6, it is assumed that the PBR value of eNB2 for a bearer a, i.e., the PBR value of SCG 605, is set to infinity.

When UE is not activated for a frequency of the configured eNB2, it receives an activation command from the eNB. When UE needs uplink synchronization of eNB2, it performs an uplink synchronization procedure through a process, such as transmission of a preamble for the frequency, etc. at operation 619.

When completing preparation for transmission of uplink data through a physical channel to SCG, based on the uplink synchronization procedure, UE transmit uplink data according to the PBR value set in operation 617 at operations 621, 623, and 625. In the embodiment of FIG. 6, although the bearer a has been established with both eNBs, since the PBR value of SCG is set to infinity, data is transmitted to only SCG.

Meanwhile, there may be a case that UE does not communicate with SCG since the UE is moving at operation 631. For example, when UE does not receive physical signals a preset number of times, it ascertains that the radio link is disconnected, which is Radio Link Failure (RLF) at operation 633.

When RLF occurs since the PBR of SCG is set to infinity and data is transmitted to only SCG, UE is confront with a state where it cannot transmit uplink data through a corresponding bearer until connection with the SCG is recovered.

In order to resolve the problem, when RLF occurs in SCG, the PBR value configured by the MCG is set to a preset value or infinity at operation 635. The preset value may be set not to exceed the total transmission rate which is available to the UE according to UE's subscription contract conditions with a telecommunication company. The preset value may be a value that has been set before the bearer is re-configured as a multiple bearer. For example, the preset value may be re-configured as the following table 1. Table 1 shows cases: bearer a is operated as MCG bearer at t1; bearer a is re-configured as a multiple bearer at t2; and RLF of SCG occurs at t3. In the table, the PBR set to M-RLC is identical to that set to MCG, and the PBR set to S-RLC is identical to that set to SCG.

TABLE 1

| | PBR set to M-RLC | PBR set to S-RLC |
|---|---|---|
| t0~t1 | X kbps | Not set to S-RLC |
| t1~t2 | infinity | Y kbps |
| t3~ | UE set PBR of M-RLC from infinity to a preset value. The preset value may be a value that has been set before M-RLC (X kbps) or that has been used before RLF occurs in S-RLC (Y kbps) | |

Therefore, UE can transmit traffic of a corresponding bearer, which has been transmitted although it is incommunicable in operation 631, through MCG, thereby maintaining transmission of uplink data at operations 637, 639 and 641.

Figure 7:
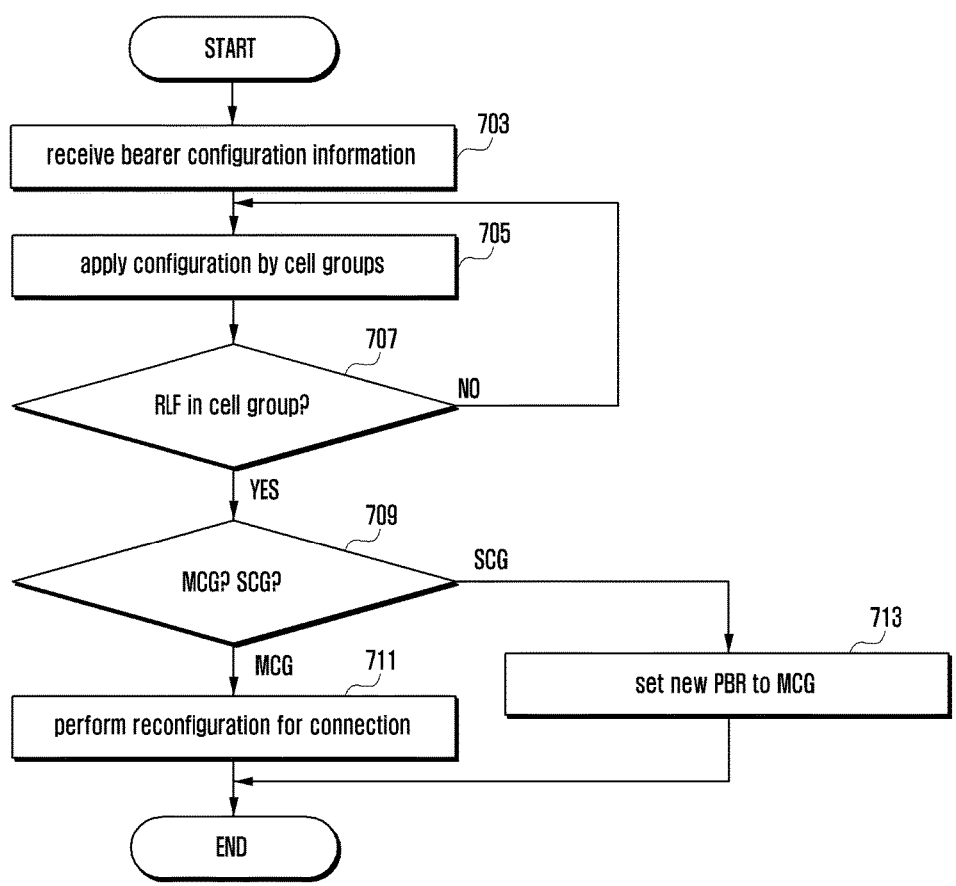
FIG. 7 is a flow chart that describes a method of automatically altering PBR by UE in an LTE system according to a first embodiment of the present disclosure.

FIG. 7 is a flow chart that describes a method of automatically altering PBR by UE in an LTE system according to a first embodiment of the present disclosure. FIG. 7 is a flow chart that describes operations of UE with a logical channel prioritization procedure when supporting multiple connections according to the present disclosure.

Referring to FIG. 7, UE receives information about bearers and information about added eNBs that UE will communicate with from eNB at operation 703. It is assumed that UE is set to communicate with a plurality of eNBs and data that are being transmitted to one bearer may be transmitted to a plurality of eNBs.

PBR values are applied to respective cell groups (MCG or SCG). UE calculates an amount of data to be transmitted respective eNBs, by using the set values, i.e., PBR values, each time uplink data that UE transmits to a corresponding bearer is created, and then transmits the data to the eNBs at operation 705.

An RLF may occur in the cell groups by various causes, e.g., movement of UE, etc. at operation 707. When UE ascertains that RLF occurred in a cell group, it determines whether RLF occurred in MCG or SCG at operation 709. When UE ascertains that RLF occurred in SCG in operation 709, it sets the PBR value of MCG to a new value to continue to transmit uplink data through a corresponding bearer at operation 713. That is, UE sets the old PBR value of MCG that has been set by MSG eNB or SCG eNB to a preset value or infinity. The preset value may be set not to exceed the total transmission rate which is available to the UE according to UE's subscription contract conditions with a telecommunication company.

On the contrary, when UE ascertains that RLF occurred in MCG in operation 709, it assumes that all connections are disconnected including the disconnection with SCG eNB, and re-configures connection with eNB at operation 711.

Therefore, although UE is disconnected in communication with SCG eNB, UE transmits data to the MCG eNB, thereby maintaining transmission of data.

Embodiment 2

In the following description, according to various embodiments of the present disclosure, UE reports a plurality of categories and perform HARQ by using one of the categories.

In order to perform transmission/reception of data between UE and eNB, the eNB needs to detect the capability of the UE. For example, eNB needs to have the maximum downlink data rate of UE, the HARQ buffer capability of UE, etc., to transmit downlink data to the UE. The capability information related to transmission/reception of downlink data of UE is reported to eNB in a category form of UE. The following table 2 is 'UE Category' defined in Specification 36.306. UE categories may be classified with respect to the capability to receive downlink data as follows: Category 1 is 10 Mbps; Category 2 is 50 Mbps; Category 3 is 100 Mbps; Category 4 is 150 Mbps; Category 5, 6, and 7 are 300 Mbps; and Category 8 is 3 Gbps. Since categories of the related art require a relatively high level of processing ability, a new category needs to be introduced that requires a relatively low level of processing ability for UE of low price. The present disclosure employs a new category, e.g., category x. Category x allows for UE supporting a transmission rate of, for example, about 1 Mbps. The following table 2 describes category and the related parameters.

TABLE 2

| UE Category | Maximum number of bits received by UE within a TTI (1 ms) | Total number of soft channel bits (Buffer size) | Maximum number of layers supported in downlink |
| --- | --- | --- | --- |
| Category 1 | 10296 | 250368 | 1 |
| Category 2 | 51024 | 1237248 | 2 |
| Category 3 | 102048 | 1237248 | 2 |
| Category 4 | 150752 | 1827072 | 2 |
| Category 5 | 299552 | 3667200 | 4 |
| Category 6 | 301504 | 3667200 | 2 |
| Category 6' | 301504 | 3667200 | 4 |
| Category 7 | 301504 | 3667200 | 2 |
| Category 7' | 301504 | 3667200 | 4 |
| Category 8 | 2998560 | 35982720 | 8 |
| Category x | 1000 | 12000 | 1 |

Categories 1 to 5 were introduced to LTE Specification Release 8. Categories 6 to 8 were introduced to LTE Specification Release 10. Category 11 was introduced to LTE Specification Release 12. Therefore, eNB of Release 8 cannot comprehend Categories 6 to 8, etc. eNB of Release 10 cannot comprehend Category x. In the following description, for the sake of convenience, a set of Categories 1 to 5 is called Category Group 1; a set of Categories 6 to 8 is called Category Group 2; and Category x is called Category Group 3. Each Category Group may include one or more categories. In part of the present description, Category and Category Group will be used in the same sense.

eNBs of Releases 8 and 9 cannot comprehend Category Groups 2 and 3. eNBs of Releases 10 and 11 cannot comprehend Category Group 3. eNBs of Releases 12 and the following Release can comprehend all categories. Since UE does not comprehend release of eNB, it may report a number of categories according to the states. For example, UE of Category Group 2 reports Category Group 1 as well as Category Group 2. UE of Category Group 3 also reports Category Group 1 as well as Category Group 3. As described below, since category is closely related to the size of a soft buffer, UE and eNB need to employ the same category. Therefore, for UE that has reported a plurality of categories to eNB, a method is required to apply the same category to the UE and eNB. A detailed description about the items in the table 2 is provided as follows.

Referring to Table 2, as the 'Maximum number of bits received by UE within a TTI (1 ms)' is multiplied by 1000, it can be converted into the maximum transmission rate per second of a system.

Referring to Table 2, the 'total number of soft channel bits' is related to the buffer size of UE and affects a rate matching process. When the 'total number of soft channel bits' is denoted by $N_{soft}$, the soft buffer size for the transport block by $N_{IR}$ bits, and the soft buffer size for the code block by $N_{cb}$ bits, The $N_{IR}$ and $N_{cb}$ are obtained as the following Equation 1.

$$N_{IR} = \left\lfloor \frac{N_{soft}}{K_{MIMO} \cdot \min(M_{DL\_HARQ}, M_{limit})} \right\rfloor, \quad \text{Equation 1}$$

$$N_{cb} = \min\left(\left\lfloor \frac{N_{IR}}{C} \right\rfloor, K_w\right)$$

Where $K_{MIMO}$ is equal to 1 or 2 based on transmission modes and min ($M_{DL\_HARQ}$, $M_{limit}$) is a constant, 8. C is the number of code blocks. $K_W$ is the circular buffer of length, $K_w=3K_\Pi$. $K_w$ is 6144 bits as the inter-leaver sub-block size. That is, as expressed in Equation 1, $N_{soft}$ affects $N_{IR}$. When $N_{IR}/C$ is less than $K_w$, or when data is transmitted/received at a high rate, $N_{IR}$ affects $N_{cb}$. Since puncturing/repetition pattern is affected according to the $N_{cb}$, if $N_{soft}$ between UE and eNB is correctly comprehended, it will be easily appreciated that malfunctions may occur. The other details related to rate matching, etc., follow Specification 36.212.

Figure 8:
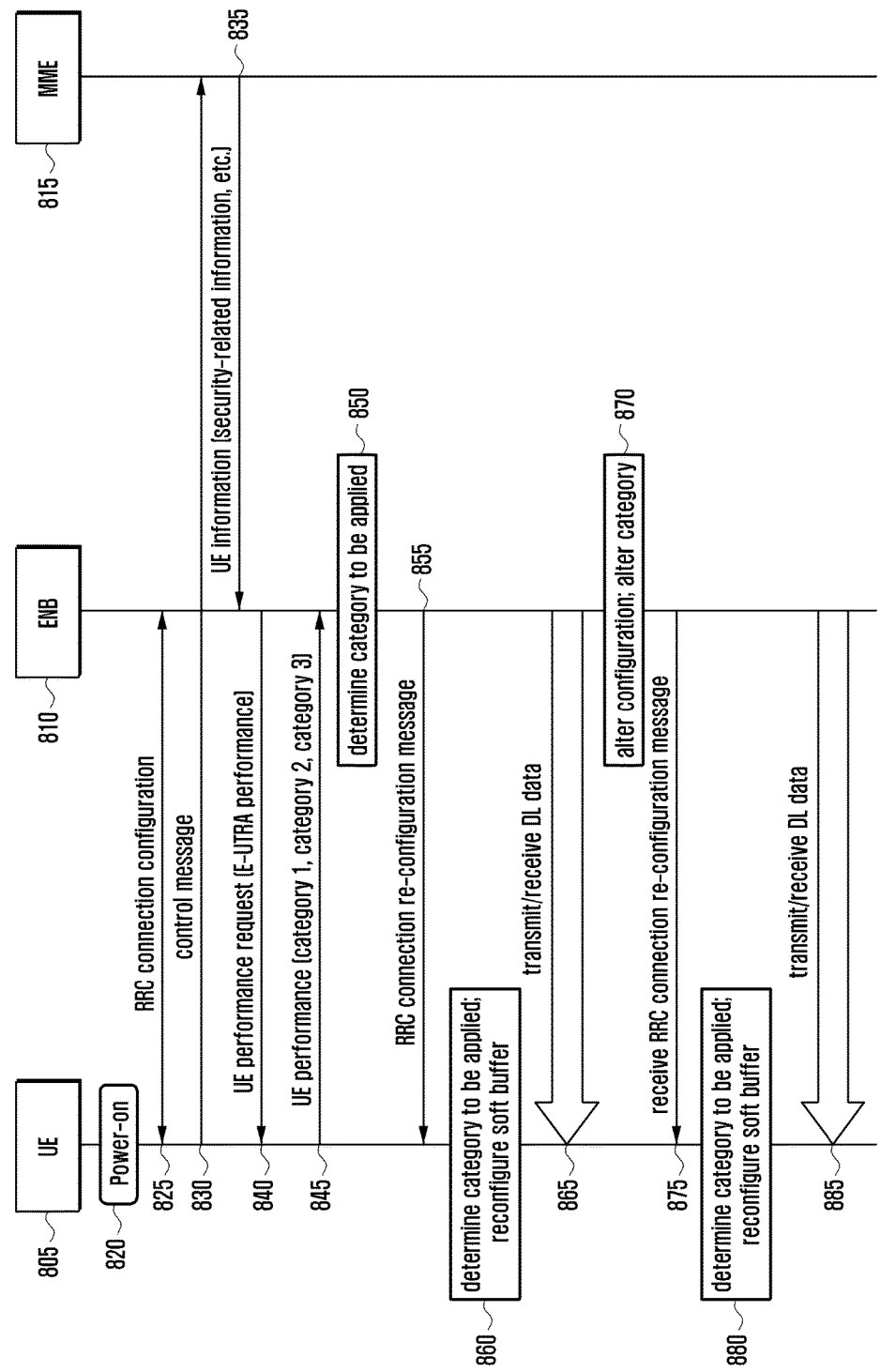
FIG. 8 is a signal flow chart that describes the entire process of reporting the capability by UE in an LTE system according to a second embodiment of the present disclosure.

FIG. 8 is a signal flow chart that describes the entire process of reporting the capability by UE in an LTE system according to a second embodiment of the present disclosure.

Referring to FIG. 8, in a mobile communication system including UE 805, eNB 810 and MME 815, UE is turned on at operation 820. UE searches cells for an accessible cell. When UE searched an accessible cell, it performs a Radio Resource Control (RRC) connection establishment procedure (refer to Specification 36.331) to establish an RRC connection with eNB through the cell at operation 825. UE transmits control messages to MME through the established RRC connection at operation 830. The control messages may be a message for requesting a start of services, SERVICE REQUEST, or a message for requesting an initial registration, ATTACH REQUEST.

MME determines whether to accept the UE's request through a procedure. When MME accepts the UE's request and determines to provide a mobile communication service to the UE, it transmits a control message including information about the UE to the eNB at operation 835. The control message may include information that the eNB needs to use to transmit/receive data to/from the UE, e.g., security key, service profile information about the UE, etc. When the MME has included capability information about the UE, it may also include the capability information in the control message.

On the contrary, when the MME has not included capability information about the UE, the eNB transmits an RRC control message to the UE in order to obtain the capability information about the UE at operation 840. The RRC control message is UE CAPABILITY ENQUIRY and may include a field containing an instruction requesting the capability of Radio Access Technology (RAT). LTE eNB may configure the field to request the capability about E-UTRA. When the UE receives the RRC control message, it checks the capability of a requested RAT.

When the UE ascertains that the capability of E-UTRA is requested through the RRC control message, it creates a message containing the capability related to E-UTRA, UE CAPABILITY INFORMATION, and transmits the message to the eNB at operation 845. The UE CAPABILITY INFORMATION may include information about at least one category. As described below, category information contained in the UE CAPABILITY INFORMATION may vary according to categories of capability that UE reporting the UE CAPABILITY INFORMATION belonged to.

When the capability of UE corresponds to one of Categories 1 to 5, the UE reports only Category Group 1 that its capability belonged to.

When the capability of UE corresponds to one of Categories 6 to 8, the UE reports Category Group 2 that its capability belonged to and Category Group 1 similar to Category Group 2. For example, UE of Category 6 or 7 reports Category 4 as Category Group 1. UE of Category 8 reports Category 5 as Category Group 1.

When the capability of UE corresponds to Category x, the UE reports Category Group 3 that its capability belonged to and Category Group 1 similar to Category Group 3. For example, UE of Category x reports Category x as Category Group 3. UE of Category x reports Category 1 as Category Group 1.

When eNB receives the capability information about the UE, it determines the configuration for the UE based on the capability information, and also Category to be applied to the UE at operation 850.

The eNB may configure an antenna, a transmission mode (TM), CA, etc., and determines a Category to be applied, considering the configuration, according to a rule. The rule will be described in detail referring to FIG. 8. The eNB transmits a control message (e.g., RRC connection re-configuration message) containing the configuration information to the UE at operation 855. The control message includes information about a category that the UE has applied to the UE. The UE may configure an antenna, a TM, CA, etc., by applying the configuration information in the control message. The UE determines a category to be applied, based on the configuration information in the control message, and re-configures the downlink HARQ soft buffer according to the determined category at operation 860.

The eNB configures a downlink HARQ buffer by applying $N_{soft}$ of the determined category, and transmits downlink data to the UE by using the HARQ buffer at operation 865. For example, the eNB determines $N_{IR}$ by applying $N_{soft}$ of the determined category, and determines the HARQ soft buffer size according to the $N_{IR}$. If $N_{soft}$ and $N_{IR}$ are altered, the soft buffer size is also altered to comply with the alterations. If the re-configured soft buffer size is reduced to be less than the previous soft buffer size, the UE removes data from the soft buffer, which is more than the re-configured soft buffer size, leaving only data in the soft buffer, which is less than the re-configured soft buffer size. This process is called a 'data management in soft buffer re-configuration.'

The UE receives downlink data from the eNB by using the re-configured soft buffer at operation 865.

After that, the eNB may alter the configuration of the UE at any time. This leads to the alteration of category to be applied at operation 870. For example, when the UE is requested for a handover to a new eNB, if the new eNB cannot comprehend part of the category of the UE since the release version of the new eNB is lower than that of the previous eNB, a new category needs to be applied. For example, when a target eNB determines configuration information to be applied to UE after a handover for the UE and transmits it to a source eNB, the source eNB transmits an RRC connection re-configuration message containing the configuration information to the UE at operation 875. The RRC connection re-configuration message includes a control message for handover. The UE establishes downlink synchronization with the target cell indicated by the control message. The UE determines a category to be applied in the target cell, by using the information contained in the RRC connection re-configuration message. After that, the UE re-configures the downlink soft buffer according to the determined category at operation 880. The UE receives downlink data from the target cell by using the re-configured downlink soft buffer at operation 885. In particular, when the UE has established downlink synchronization with the target cell, it performs Random Access procedure in the target cell. After completing the Random Access procedure, the UE starts using the re-configured downlink soft buffer.

Figure 9:
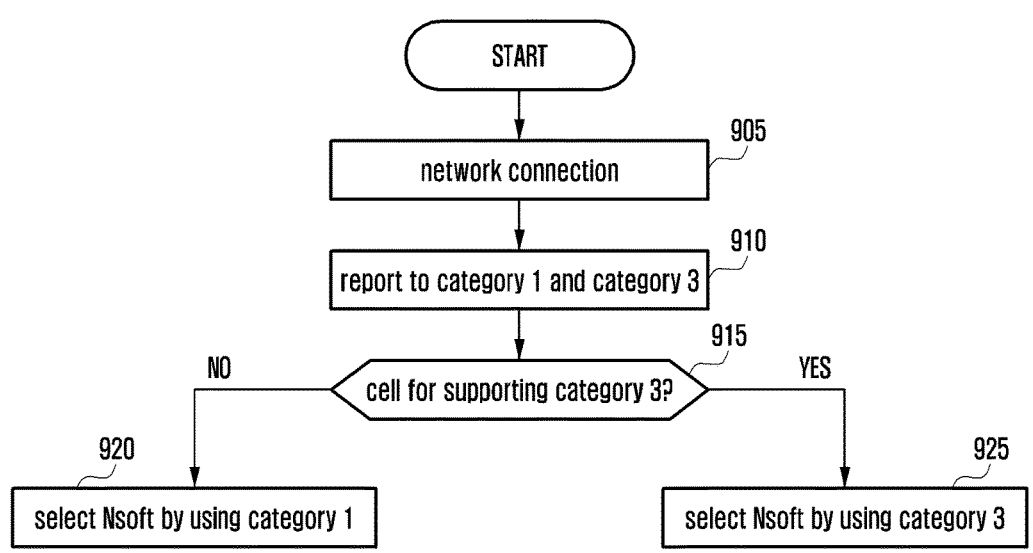
FIG. 9 is a flow chart that describes a method of determining a size of Hybrid Automatic Repeat reQuest (HARQ) buffer by UE in an LTE system according to a second embodiment of the present disclosure.

FIG. 9 is a flow chart that describes a method of determining a size of HARQ buffer by UE in an LTE system according to a second embodiment of the present disclosure.

UE determines the category before it starts performing the procedure shown in FIG. 9. Category of UE may be determined during the manufacturing process and stored in the non-volatile memory, etc. As described above, UE may have at least one category. UE that belongs to Category Group 3 also has Category Group 1 that old eNBs can recognize in order to prepare for a case where the UE is connected to the old eNBs. When the UE is turned on, it selects an appropriate cell that it will camp on, through a cell search process, and then performs a network access procedure through the cell at operation 905. The eNB broadcasts a condition as to whether it supports Category Group 3 in a corresponding cell, through the system information. The UE first connects to a cell where Category Group 3 is supported.

The UE reports the capability information along with the UE's category at operation 910. UE of Category Group 3 reports Category Group 1 and Category Group 3. The UE reports category 1, which is most similar to Category Group 3, as Category Group 1. The UE reports category x as Category Group 3.

The UE checks whether the current serving cell supports Category Group 3 in order to compute $N_{soft}$ by applying one of the two reported categories at operation 915. For example, the UE checks whether System Information Block (SIB) of the system information about a serving cell (e.g., SIB 1 or SIB 2) contains control information (e.g., information as to whether the cell supports Category Group 3).

When the UE ascertains that the current serving cell does not support Category Group 3 in operation 915, it determines $N_{soft}$ by applying Category Group 1 at operation 920. For example, when the UE has reported Category x as Category Group 3 and also Category 1 as Category Group 1, it applies Category 1.

When the UE ascertains that the current serving cell supports Category Group 3 in operation 915, it determines $N_{soft}$ by applying Category Group 3 at operation 925. For example, when the UE has reported Category x as Category Group 3 and also Category 1 as Category Group 1, it applies Category x.

Figure 10:
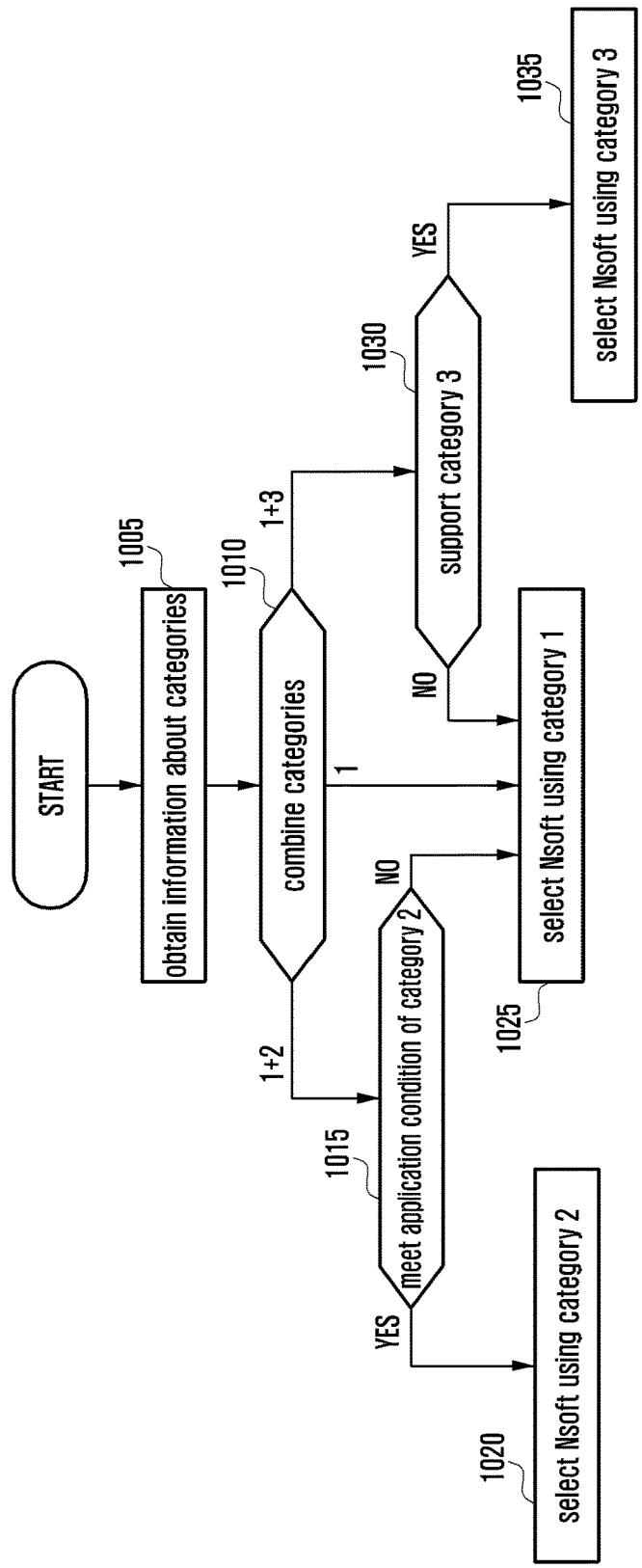
FIG. 10 is a flow chart that describes a method of determining a size of HARQ buffer by eNB in an LTE system according to a second embodiment of the present disclosure.

FIG. 10 is a flow chart that describes a method of determining a size of HARQ buffer by eNB in an LTE system according to a second embodiment of the present disclosure.

Referring to FIG. 10, the eNB obtains category information about UE with which the eNB has established an RRC connection at operation 1005.

The eNB checks the category information type and determines the following process at operation 1010. When the category information includes Category 1 and Category 2, the eNB proceeds with operation 1015. When the category information includes only Category 1, the eNB proceeds with operation 1025. When the category information includes Category 1 and Category 3, the eNB proceeds with operation 1030.

The eNB checks whether the application condition for Category Group 2 is satisfied in operation 1015. When the eNB ascertains that the application condition for Category Group 2 is satisfied in operation 1015, it proceeds with operation 1020. When the eNB ascertains that the application condition for Category Group 2 is not satisfied in operation 1015, it proceeds with operation 1025. The application condition for Category Group 2 is one of the following cases:

Condition 1 to select Category Group 2: No serving cell configured in TM 10, and at least one serving cell configured in TM 9

Condition 2 to select Category Group 2: UE is configured for: serving cells of up to maximum two; and at least one serving cell configured in TM 9

The conditions to select a category are classified according to transmission modes defend in UE.

TM 9 and TM 10 are forward transmission modes defined in Specification 36.213. TM 9 is a mode where single-user multiple-input multiple-output (SU-MIMO) with links of up to maximum 8 is supported. TM 10 is a mode where Coordinated Multi-Point transmission (CoMP) is supported. As a transmission mode to which a high data transmission rate is likely to be applied is previously correlated with a category of a high data transmission rate, the eNB can determine a corresponding category to be applied.

The eNB determines $N_{soft}$ by applying Category Group 2 when performing downlink HARQ to UE at operation 1020.

The eNB determines $N_{soft}$ by applying Category Group 1 when performing downlink HARQ to UE at operation 1025.

The eNB checks whether a serving cell of UE supports Category Group 3 at operation 1030. When the eNB ascertains that a serving cell of UE does not support Category Group 3 in operation 1030, it proceeds with operation 1025.

When the eNB ascertains that a serving cell of UE supports Category Group 3 in operation 1030, it determines $N_{soft}$ by applying Category Group 3 when performing downlink HARQ to UE at operation 1035.

256 Quadrature Amplitude Modulation (QAM) is supported since 3GPP Release 12. Since 256 QAM requires the change in hardware between UE and eNB, it is supported by not all devices. Another embodiment of the present disclosure provides a method of checking whether UE supports 256 QAM by using UE category and UE release information (refer to accessStratumRelease, Specification 36.331).

UE reports UE category and UE release information to eNB through the capability report message. Release information shows a release of LTE standards by which UE has been implemented.

The UE category and UE release information have a feature that UE must report them to eNB regardless of whether it supports 256 QAM. According to a tacit standard between UE and eNB, UE devices that belong to categories since Release 12 support 256 QAM. UE does not need to provide additional information in order to report a condition as to whether it supports 256 QAM. eNB checks Release and Category of UE and determines whether UE supports 256 QAM.

In the following description, Category related to a condition as to whether to support 256 QAM is called 256 QAM Category. 256 QAM Category may be, for example, Category 4, Category 5, Category 6, Category 7, Category 8, etc. That is, from among the UE devices that have reported that they support at least one of the categories, UE devices of a version of Release (e.g., Release 12) and beyond report a condition as to whether they support 256 QAM.

As described above, UE always reports categories of Category Group 1; however may or may not report categories of Category Group 2 or Category Group 3. Therefore, UE of Release 12 and beyond is designed to report two or more categories. In that case, any one of the categories belongs to 256 QAM Category, the UE is determined as UE that supports 256 QAM.

According to an embodiment of the present disclosure, UE sets: first information (UE category information) indicating the buffer size and transmission rate to a predetermined first value; and second information (UE release information) indicating a version of release by which the UE has been implemented to a predetermined second value that is greater than the first value, in order to report a condition as to whether it supports 256 QAM. The UE may transmit plural first information and one of them may set to a predetermined value.

When eNB receives the capability information about UE and detects that the first information reported by the UE is a first value and a second value of the second information is greater than the first value, it ascertains that the UE supports 256 QAM. When the eNB ascertains that a downlink channel status of the UE satisfies a preset condition (or better than a preset standard), it transmits 256 QAM modulated downlink data to the UE.

Embodiment 3

Embodiment 3 is related to operations between eNB and UE configuring SPS and TTI bundling.

TTI bundling is processes for transmitting the same data through four successive sub-frames in order to resolve the lack of reverse transmission output power that occurs during the cell change. Semi-Persistent Scheduling (SPS) is to allocate fixed resources in order to effectively support services that continuously create packets of a fixed size at a fixed period, such as a VoIP service. SPS reduces the amount of PDCCH used and increases the number of VoIP service users supportable once.

When UE runs on in a macro cell, TTI bundling and SPS may be applied at the same time, but instead the efficiency may decrease. Applying TTI bundling means a state where UE is located in alteration of a macro cell. In that case, the channel status of the UE is unstable. Therefore, it is more efficient to allocate dynamical transmission resources by reflecting the channel status of the UE than fixed resources by SPS.

When UE operates in DC, the UE transmits/receives data to/from a macro cell and a small cell, simultaneously. If the UE is geographically located in alteration of a macro cell, it needs to apply TTI bundling in order to perform transmission/reception of data in the macro cell. On the contrary, the UE may experience a channel environment in a small cell that is quite different from that of the macro cell, and may still use SPS.

Considering the conditions described above, the various embodiments of the present disclosure allow for simultaneous configuration of TTI bundling and SPS with respect to a particular condition (e.g., DC has been configured in UE, TTI bundling in PCell, and SPS in PSCell); however, do not allow for simultaneous configuration of TTI bundling and SPS with respect to the other cases.

The eNB determines whether to configure SPS considering a TTI bundling configuration condition of UE or whether to configure TTI bundling considering an SPS configuration condition. When UE receive a control message instructing a simultaneous configuration of TTI bundling and SPS, it determines whether the control message is proper and then follows the instruction of the control message.

Figure 11:
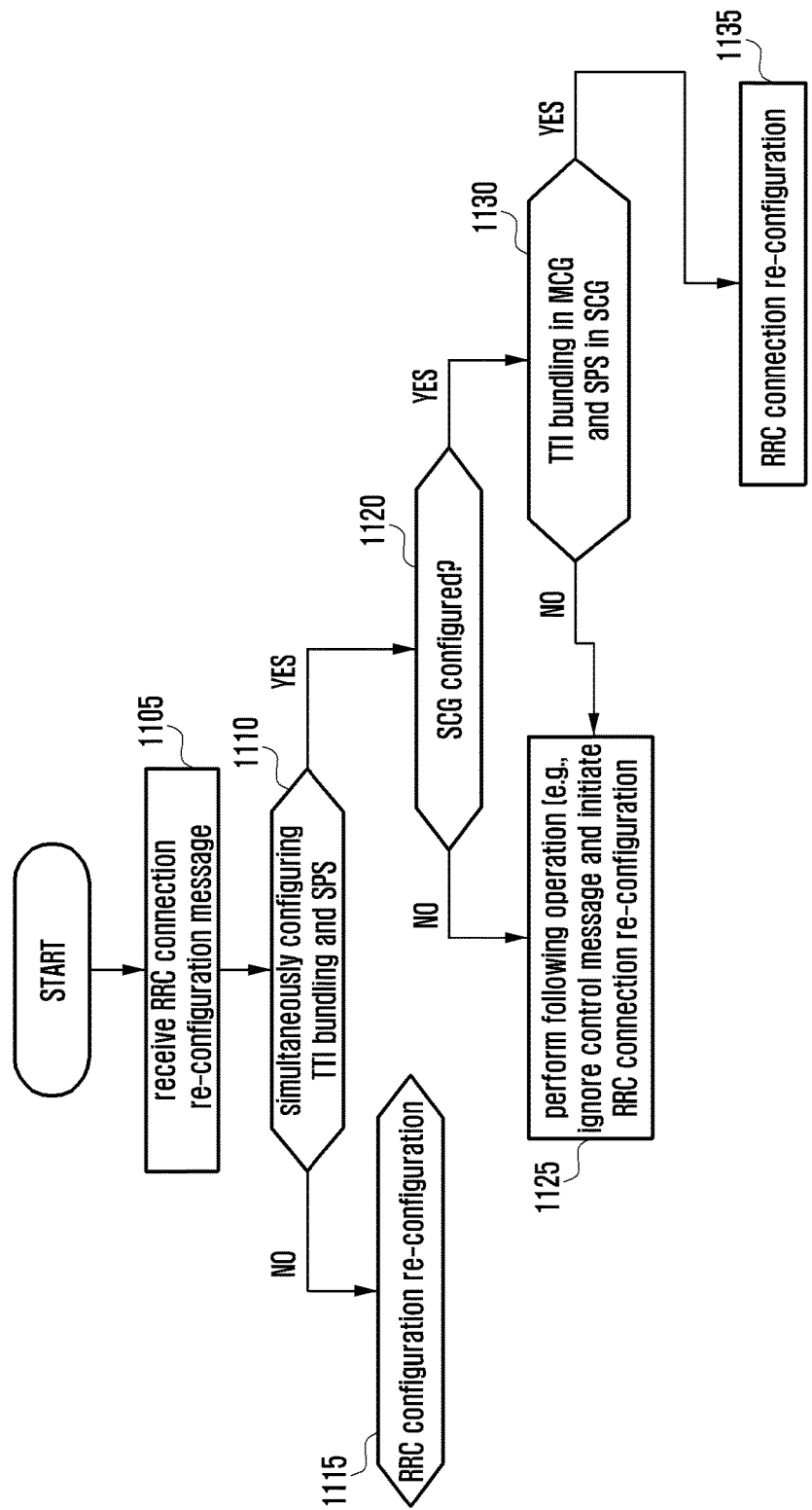
FIG. 11 is a flow chart that describes a method of bundling transmission time interval (TTI) and establishing semi-persistent scheduling (SPS) by UE in an LTE system according to a third embodiment of the present disclosure.

FIG. 11 is a flow chart that describes operations of UE according to an embodiment of the present disclosure.

Referring to FIG. 11, UE receives a control message instructing RRC connection re-configuration, RRC CONNECTION RECONFIGURATION, from eNB (refer to Specification 36.331) at operation 1105.

When UE re-configures RRC connection according to the control message, it determines whether a simultaneous configuration of TTI bundling and SPC is configured at operation 1110. When UE ascertains that a simultaneous configuration of TTI bundling and SPC is configured in operation 1110, it proceeds with operation 1120. When UE ascertains that a simultaneous configuration of TTI bundling and SPC is not configured in operation 1110, it proceeds with operation 1115. For example, when TTI bundling has been configured before the UE receives the control message and the received control message instructs a configuration of SPS, the UE proceeds with operation 1120. Similarly, when SPS has been configured before the UE receives the control message and the received control message instructs to apply TTI bundling, the UE proceeds with operation 1120. When the UE meets any case other than the two cases above, it proceeds with operation 1115. Configuring SPS is used in the same sense of providing an SPS transmission resource period, semiPersistSchedIntervalDL, semiPersistSchedIntervalUL (refer to Specification 36.331) and information about HARQ process that SPS transmission resources will use (numberOfConfSPS-Processes (refer to Specification 36.331) to the UE through the RRC control message. Configuring TTI bundling is used in the same sense of containing an information element (IE) of ttiBundling set to TRUE in an RRC control message.

The UE re-configures an RRC connection according to the instruction of the received RRC control message at operation 1115. For example, when the control message instructs to configure TTI bundling, the UE applies TTI bundling in a serving cell (e.g., PCell).

In order to determine whether UE can configure a simultaneous configuration of TTI bundling and SPC, the UE checks whether the configuration of the UE is the following configuration, Configuration 1, according to the instruction of the control message at operation 1120. When the UE ascertains that the configuration of the UE is the following configuration, Configuration 1, in operation 1120, it proceeds with operation 1130. On the contrary, when the UE ascertains that the configuration of the UE is not the following configuration, Configuration 1, in operation 1120, it proceeds with operation 1125. For example, when the control message directly indicates Configuration 1, or the UE has been set with Configuration 1 before receiving the control message, the UE proceeds with operation 1130.

[Configuration 1]

At least one SCG is configured (i.e., DC is configured), and only one uplink is set in MCG (i.e., a serving cell where only PCell is set with uplink and the other cells, SCells, are set with downlink).

The UE detects that the received control message or the current configuration has failed and performs the following process at operation 1135. Examples of the following process are below.

[Following Process 1]

Ignoring the received RRC control message and performing RRC connection reestablishment procedure (refer to Specification 36.331)

[Following Process 2]

Ignoring the received RRC control message and maintaining the current configuration

[Following Process 3]

Configuring only one function of TTI bundling and SPS and reserving configuration of the other functions. In general, since TTI bundling is much more important than SPS when marinating the connection of UE, only TTI bundling is applied. SPS is not applied.

The UE determines whether TTI bundling is configured for only MCG (or PCell) and SPS is configured for only SCG (or PSCell) in operation 1130. When the UE ascertains that TTI bundling is configured for only MCG and SPS is configured for only SCG in operation 1130, it proceeds with operation 1135. On the contrary, when the UE ascertains that the determination does not satisfy the condition, for example, SPS is configured for MCG, it proceeds with operation 1125. Configuring TTI bundling for only MCG means that MAC configuration information for MCG (MAC-mainConfig) includes ttiBundling information, indicated to UE, and MAC configuration information for SCG (or control information configuring SCG or control information configuring PSCell) does not include ttiBundling information.

Configuring SPS for only SCG (or PSCell) means that configuration information related to SPS (SPS-config) is not included in MAC configuration information about MCG but is included in MAC configuration information about SCG (or control information configuring SCG or control information configuring PSCell).

The eNB may determine to configure transmission time interval (TTI) bundling for an UE on PCell, may determine whether SPS is configured for the UE, may determine whether the SPS is configured on the PCell or PSCell if the SPS is configured for the UE, may generate a radio resource control (RRC) message indicating configuration of the TTI bundling on the PCell if the SPS is configured on PSCell, and may transmit the RRC message to the UE. The eNB may determine to configure TTI bundling for the terminal on PCell based on channel status of the terminal and based on available transmission power of the terminal. The TTI bundling is not configured on the PCell if the SPS is configured on the PCell.

Embodiment 4

Another embodiment of the present disclosure provides a method of performing downlink HARQ by UE operating in Discontinuous Reception (DRX) mode. In particular, the embodiment of the present disclosure provides a method of determining a length (time interval) of HARQ RTT timer that UE drives to receive HARQ re-transmission.

When UE operating in DRX mode receives downlink data, it is triggered until Active Time in order to receive re-transmission for the downlink data after a time interval set by the HARQ RTT time has elapsed. The HARQ RTT timer is set to stop after four subframes from a time point that the UE transmitted the HARQ feedback in response to the downlink data; has a fixed value of eight subframes in an FDD serving cell; and is defined as (k+4) subframes in a TDD serving cell, where k is a value defined according to the TDD configuration and follows the definition in Specification 36.213.

In the present disclosure, UE determines a time interval of the HARQ RTT timer, considering the type of serving cell that has received downlink data.

Figure 12:
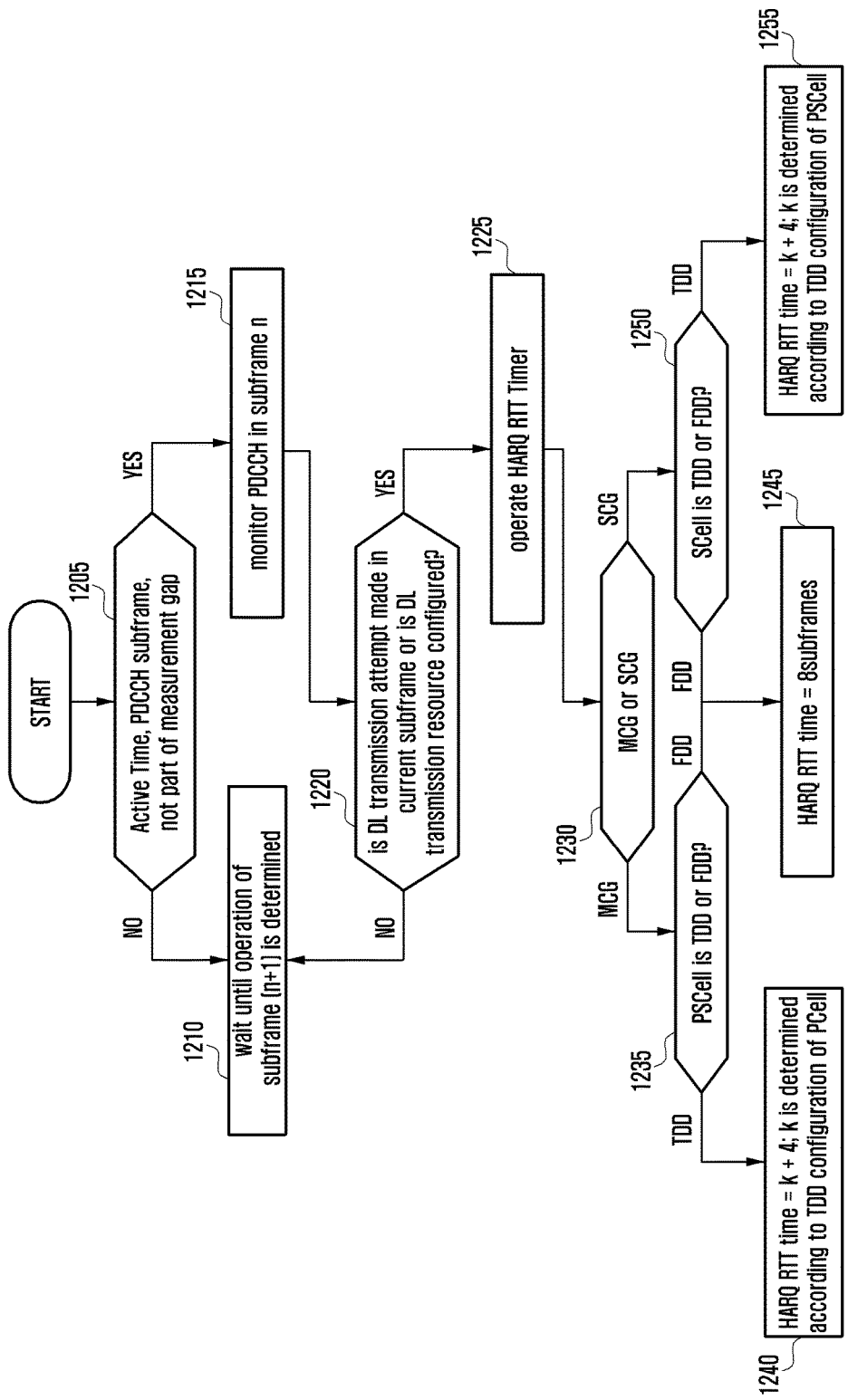
FIG. 12 is a flow chart that describes a method of determining a length of HARQ Round Trip Time (RTT) timer by UE in an LTE system according to a fourth embodiment of the present disclosure.

A method of determining operations of UE in subframe n is described referring to FIG. 12.

FIG. 12 is a flow chart that describes a method of determining a length of HARQ RTT timer by UE in an LTE system according to a fourth embodiment of the present disclosure.

Referring to FIG. 12, the UE checks whether subframe n satisfies conditions as follows at operation 1205. When the UE ascertains that subframe n satisfies the following conditions in operation 1205, it proceeds with operation 1215. When the UE ascertains that subframe n does not satisfy the following conditions in operation 1205, it proceeds with operation 1210.

Conditions

A corresponding subframe is: Active Time (which is a period of time that UE operating in DRX is monitoring PDCCH, specified in Specification 36.321); is PDCCH subframes (which transmit/receive PDCCH, specified in Specification 36.321); but is not part of configured measurement gap (specified in Specification 36.321).

When the UE ascertains that all the conditions are satisfied, it proceeds with operation 1215. When the UE ascertains that any one of the conditions is not satisfied, it proceeds with operation 1210 and waits until the operation of the next subframe is determined.

The UE monitors PDCCH of subframe n at operation 1215. That is, the UE monitors whether scheduling information addressed to C-RNTI of the UE is received thorough the PDCCH.

The UE checks whether downlink transmission is instructed through PDCCH of subframe n or downlink transmission resource assignment is configured to subframe n at operation 1220. When the UE ascertains that downlink transmission is instructed through PDCCH of subframe n or downlink transmission resource assignment is configured to subframe n in operation 1220, it proceeds with operation 1220. When the UE ascertains that downlink transmission is not instructed through PDCCH of subframe n or downlink transmission resource assignment is not configured to subframe n in operation 1220, it proceeds with operation 1210. The configuration of downlink transmission resources may be, e.g., a case where downlink SPS is configured in a corresponding subframe.

The UE starts HARQ RTT timer at operation 1225 and receives downlink data according to the PDCCH on a cell belonging to a cell group. When decoding received downlink data is failed, the UE remains Active Time state or triggers Active Time in order to receive re-transmission after the HARQ RTT time has expired.

In order to determine a length (time interval) of HARQ RTT timer, it proceeds with operation 1230. The operations 1230 to 1255 for determining a length of HARQ RTT timer may be performed before operation 1225.

The UE checks whether a serving cell receiving the downlink data is MCG or SCG at operation 1230. The HARQ RTT timer is set to predetermined number of subframes based on the cell group where the downlink assignment is received and based on a duplex mode of PCell or PSCell. When the UE ascertains that a serving cell receiving the downlink data is MCG in operation 1230, it proceeds with operation 1235. On the contrary, when the UE ascertains that a serving cell receiving the downlink data is SCG in operation 1230, it proceeds with operation 1250.

The UE checks whether PCell is operated in FDD or TDD at operation 1235. When the UE ascertains that PCell is operated in FDD in operation 1235, it proceeds with operation 1245. On the contrary, when the UE ascertains that PCell is operated in TDD in operation 1235, it proceeds with operation 1240.

The UE determines K according to UL/DL configuration of PCell at operation 1240. The relationship between K and TDD UL/DL configuration follows Table 10.1.3.1-1 of Specification 36.213. The value of HARQ RTT timer is set to K+4.

The UE sets the length of HARQ RTT timer to eight subframes at operation 1245.

The UE checks whether PSCell is operated in FDD or TDD at operation 1250. When the UE ascertains that PSCell is operated in FDD in operation 1250, it proceeds with operation 1245. On the contrary, when the UE ascertains that PSCell is operated in TDD in operation 1250, it proceeds with operation 1255.

The UE determines K according to UL/DL configuration of PSCell at operation 1255. The relationship between K and TDD UL/DL configuration follows Table 10.1.3.1-1 of Specification 36.213. The value of HARQ RTT timer is set to K+4.

When the UE ascertains that PCell is operated in FDD, it sets the HARQ RTT timer for all MCG serving cells to eight. When the UE ascertains that PCell is operated in TDD, it sets the HARQ RTT timer for all MCG serving cells is set to k+4. k is determined according to TDD UL/DL configuration of PCell.

When the UE ascertains that PSCell is operated in FDD, it sets the HARQ RTT timer for all SCG serving cells to eight. When the UE ascertains that PSCell is operated in TDD, it sets the HARQ RTT timer for all SCG serving cells is set to k+4. k is determined according to TDD UL/DL configuration of PSCell.

Embodiment 5

RLC indicates the last byte of PDCP packet included in RLC packet by using a field of Length Indicator (LI). The length of LI needs to be defined so that it can express the maximum size of the PDCP packet. One PDCP packet corresponds to one IP packet. The IP packet size is variable. The maximum size of IP packet may be ten thousands of bytes or 1500 bytes according to the characteristics of IP stream or servers providing IP stream.

In the present disclosure, UE sets lengths of LI to be different by IP streams, according to instructions of eNB. In general, since one IP stream is supported by one EPS bearer and one EPS bearer is supported by one Radio Bearer, the LI lengths according to the present are set according to EPS bearers or Radio Bearers.

When a Radio Bearer is mapped to MCG, the length of LI for the Radio Bearer is determined by MeNB.

When a Radio Bearer is re-configured from MCG bearer to SCG bearer, the length of LI for the bearer is determined by SeNB. Therefore, the length of LI for one Radio Bearer/EPS bearer varies according to whether the bearer is configured in MCG or SCG.

That is, the length of LI when the RLC of a Radio Bearer is configured in MeNB differs from that when the RLC of a Radio Bearer is configured in SeNB.

For a multiple bearer, one PDCP is connected to two RLCs and the RLCs are set in MeNB and SeNB, respectively. If LIs of different lengths are set to the two RLCs, the PDCP needs to transmit/receive PDCP packets to the two RLCs, which differ from each in the maximum size, respectively. This causes UE and eNB to increase in complexity. Therefore, the present disclosure sets the lengths of LIs for data transmitted/received through MeNB and SeNB to be either identical or different.

When the Radio Bearer is a multiple bearer, the LI length of RLC packet transmitted/received through MeNB need to be identical to that of data transmitted/received through SeNB. On the contrary, when the Radio Bearer is not a multiple bearer, the LI length of RLC packet transmitted/received through MeNB may differ from that of data transmitted/received through SeNB.

Figure 13:
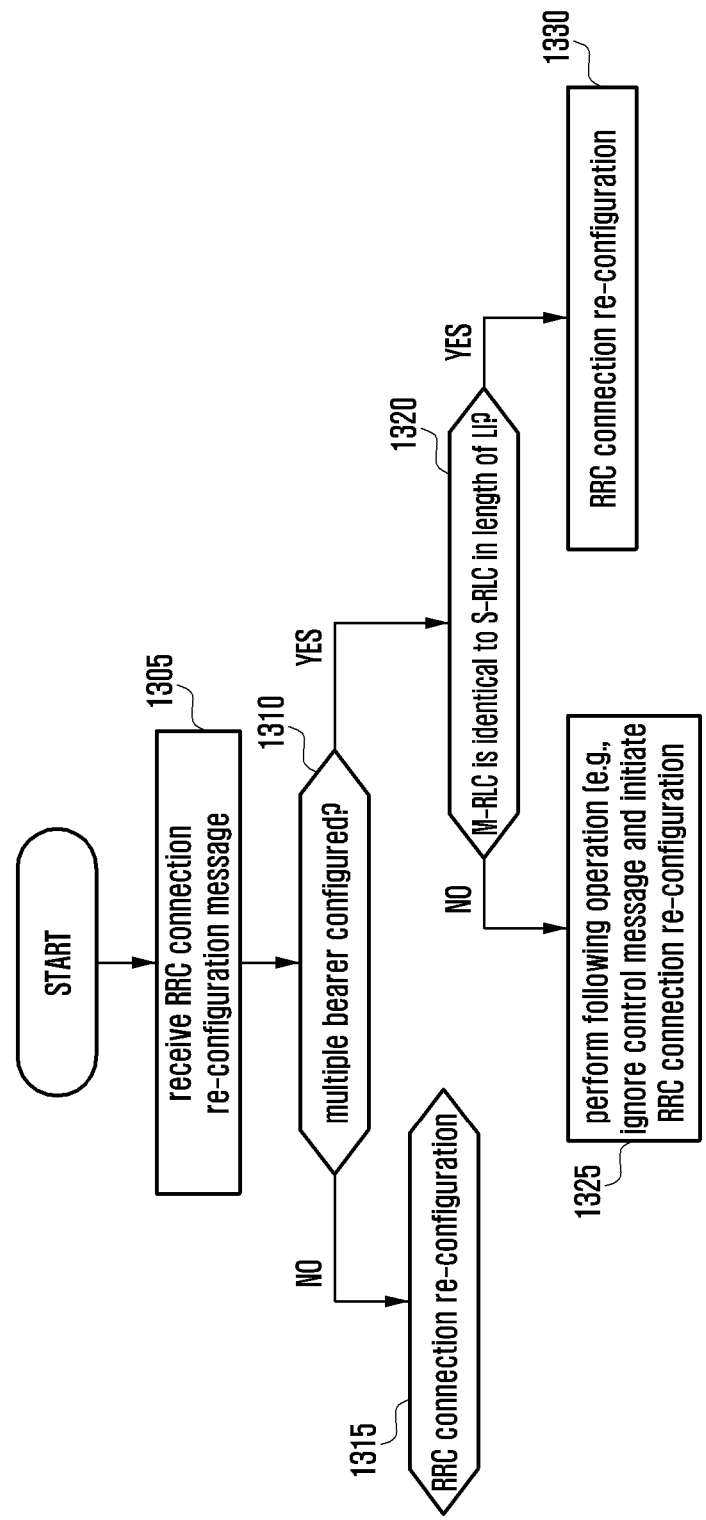
FIG. 13 is a flow chart that describes a process of establishing a multiple bearer by UE in an LTE system according to a fifth embodiment of the present disclosure.

FIG. 13 is a flow chart that describes operations of UE according to a fifth embodiment of the present disclosure.

Referring to FIG. 13, UE receives a control message instructing RRC connection re-configuration, RRC CONNECTION RECONFIGURATION, from eNB (refer to Specification 36.331) at operation 1305.

When UE re-configures RRC connection according to the control message, it determines whether a multiple bearer is configured at operation 1310. When the UE ascertains that a multiple bearer is configured in operation 1310, it proceeds with operation 1320. On the contrary, when the UE ascertains that a multiple bearer is not configured in operation 1310, it proceeds with operation 1315. Configuring a multiple bearer means that one Radio Bearer is configured with one PDCP and two RLCs, where the respective RLCs can perform transmission/reception, one RLC is set to transmit/receive data through MCG, and the other is set to transmit/receive data through SCG.

The UE re-configures RRC connection according to the instruction of the received RRC control message at operation 1315.

The UE checks whether the LI lengths of the RLCs of the multiple bearer are set to be identical to each other at operation 1320. That is, the UE checks whether the lengths of LIs of the RLC transmitting/receiving data through SCG (S-RLC) and the RLC transmitting/receiving data through MCG (M-RLC) are set to be identical to each other. When the UE ascertains that the LI lengths of the RLCs of the multiple bearer are set to be identical to each other in operation 1320, it proceeds with operation 1330. On the contrary, when the UE ascertains that the LI lengths of the RLCs of the multiple bearer are not set to be identical to each other in operation 1320, it proceeds with operation 1325.

The UE detects that the received control message has failed and performs the following process at operation 1325. Examples of the following process are below.

[Following Process 1]

Ignoring the received RRC control message and performing RRC connection reestablishment procedure (refer to Specification 36.331)

[Following Process 2]

Ignoring the received RRC control message and maintaining the current configuration In order to prevent that the lengths of LI of M-RLC and S-RLC are unintentionally set to be different from each other, it may be designed in such a way that the length of LI is set for only one of the two RLC and the LI length of the other RLC is set to be identical to that of other RLCs in the same bearer. That is, when the LI length of M-RLC has been set, information about the LI length of S-RLC is not signaled. Although information about the LI length of S-RLC is signaled, the UE ignores the information and sets the LI length of S-RLC and the LI length of M-RLC to be identical to each other.

MeNB and SeNB exchange control signals with each other in order to re-configure a Radio Bearer from MCG bearer to a multiple bearer.

When NeMB transmits a control message for requesting multiple bearer configuration (e.g., a request message of SCG configuration change) to SeNB, the SeNB transmits a control message (e.g., an acceptance message of SCG configuration change request) including real configuration information about a multiple bearer to the MeNB. The acceptance message of SCG configuration change request includes S-RLC configuration information about S-RLC, etc. MeNB transmits the S-RLC configuration information, etc. to the UE, without correcting it.

The eNB may perform the following processes so that the LI lengths of M-RLC and S-RLC of a multiple bearer are identical to each other.

When MeNB requests configuration of a multiple bearer from SeNB, the MeNB transmits, to the SeNB, a request message of SCG configuration change, including RLC configuration information about an M-RLC of the multiple bearer requested for configuration. The RLC configuration information includes information about an LI length of the M-RLC. The SeNB selects an LI length of the S-RLC of the multiple bearer to be identical to the LI length of the M-RLC.

As another example, when SeNB selects the LI length of the S-RLC of a multiple bearer as an arbitrary value and transmits an acceptance message of SCG configuration change request to the MeNB, the MeNB checks the LI length of the S-RLC. When the MeNB ascertains that the LI length of the S-RLC selected by the SeNB is identical to that of the M-RLC, the MeNB performs the following processes. On the contrary, when the MeNB ascertains that the LI length of the S-RLC selected by the SeNB differs from that of the M-RLC, the MeNB re-configures the M-RLC so that the LI length of the M-RLC is set to be identical to that of the S-RLC.

Embodiment 6

The embodiment of the present disclosure relates to an apparatus and method of allowing eNB to effectively collect information about MBMS services or MBMS services of interest that UE in idle mode are receiving. In current LTE standard technology, eNB can collect the information described above, from UE only operating in connection mode. To this end, eNB uses an MBSM counting procedure. The present disclosure provides a method of collecting the information described above from UE operating in idle mode. In particular, according to the present disclosure, UE in idle mode ignores current Access Class Barring (ACB) or uses a Random Access Technique in order to transmit the information described above to eNB.

In the following description, MBMS related technology in LTE standard is described before explain the present disclosure.

Figure 14:
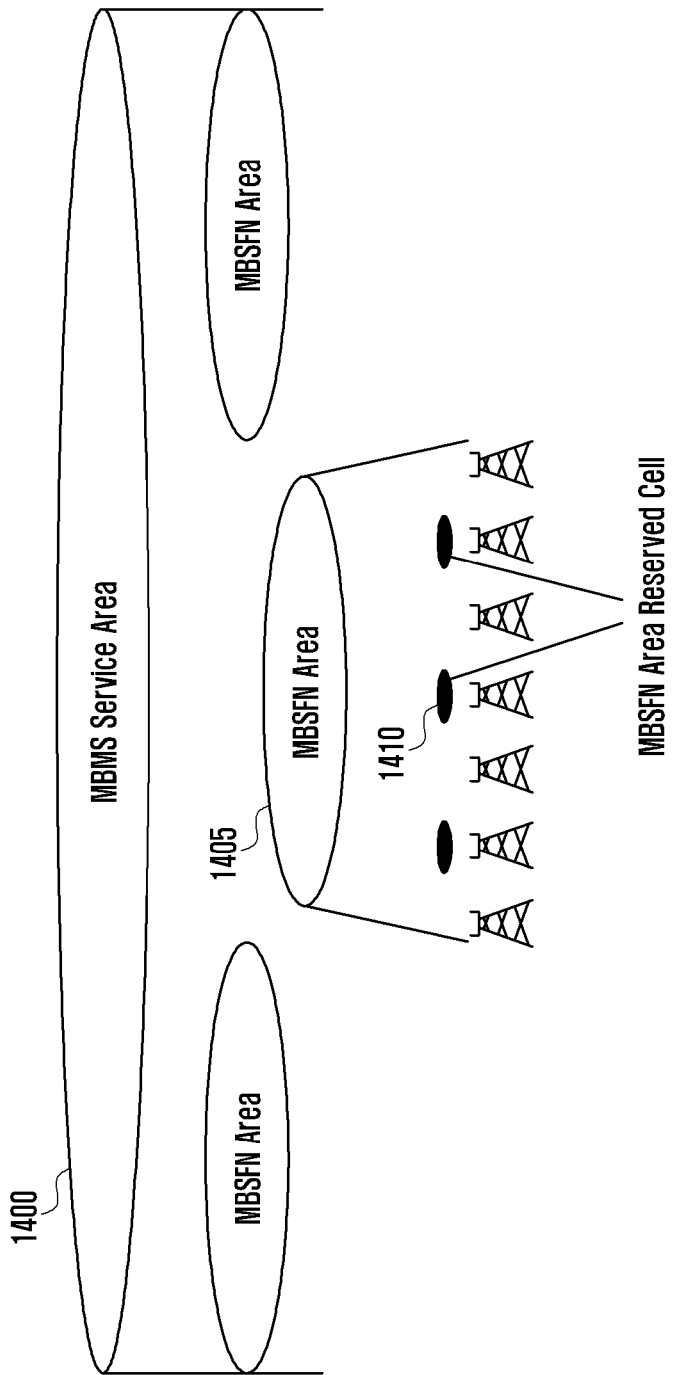
FIG. 14 is a conceptual diagram of Multimedia Broadcast Multicast Service (MBMS) according to an embodiment of the present disclosure.

FIG. 14 is a conceptual diagram of MBMS according to an embodiment of the present disclosure.

An MBMS service area 1400 is a network area where a plurality of eNBs performs transmission of Multimedia Broadcast multicast service Single Frequency Network (MBSFN).

An MBSFN Area 1405 is a network area where a number of cells are integrated to perform transmission of MBSFN and the cells are all synchronized for MBSFN transmission.

All cells except for MBSFN Area Reserved Cells 1410 are used for MBSFN transmission. MBSFN Area Reserved Cells 1410 are not used for MBSFN transmission and may be used to perform transmission for other objectives. MBSFN Area Reserved Cells 1410 may be allowed for limited transmission power, with respect to radio resources allocated to MBSFN transmission.

Figure 15:
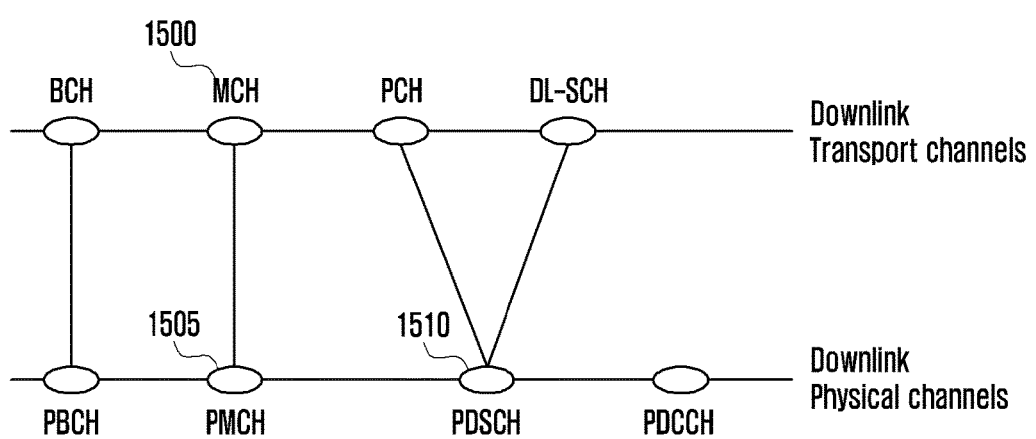
FIG. 15 is a diagram illustrating the mapping relation of downlink channel used for Multimedia Broadcast multicast service Single Frequency Network (MBSFN) transmission according to an embodiment of the present disclosure.

FIG. 15 is a diagram illustrating the mapping relation of downlink channel used for MBSFN transmission according to an embodiment of the present disclosure.

Referring to FIG. 15, MCH 1500 is between MAC layer and Physical layer. MCH 1500 is mapped to PMCH 1505 of Physical layer.

Unicast scheme for transmitting data only to particular UE uses Physical Downlink Shared Channel (PDSCH) 1510.

Figure 16:
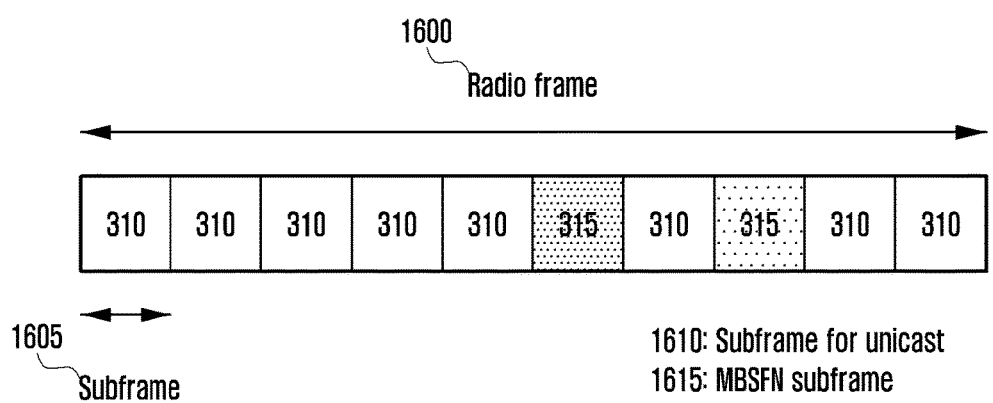
FIG. 16 is a diagram of a structure of downlink frame used in an LTE system according to an embodiment of the present disclosure.

FIG. 16 is a diagram of a structure of downlink frame used in an LTE system according to an embodiment of the present disclosure.

Referring to FIG. 16, a radio frame 1600 includes 10 subframes 1605. The subframes 1605 are divided into general subframes or 'subframes for unicast' 1610 for transmission/receiving data and 'subframes for broadcasts' 1615, which are 'MBSFN,' called MBSFN subframe.

There are differences between a general subframe and an MBSFN subframe on the structure and the number, e.g., the number of Orthogonal Frequency Division Multiplexing (OFDM) symbols, the cyclic prefix length, cell-specific reference signals (CRS), etc.

In Rel-8 and Rel-9 systems, MBSFN subframes are used only for the purpose of transmitting broadcast data or multicast data. As systems evolve, since LTE Rel-10, MBSFN subframes may also be used for unicast as well as broadcast or multicast.

In LTE, in order to efficiently use PDSCH, UE devices are separately configured according to Multi-antenna technology and TM related to Reference signal (RS).

Current LTE Rel-10 has TM1~TM9. Each UE has one TM for PDSCH transmission. TM 8 is newly defined in Rel-9. TM 9 is also defined in Rel-10.

In particular, TM 9 supports SU-MIMO with ranks of maximum 8. TM 9 supports transmission of multiple layers. In de-modulation, TM 9 allows for transmission of maximum 8 layers by using Rel-10 Demodulation Reference Signal (DMRS). The Rel-10 DMRS transmits precoded DMRS; however does not inform the receiving end of a corresponding precoder index. In order to support TM 9, a format of 2C for Downlink Control Information (DCI) is newly defined in Rel-10. UE before Rel-10 does not try decoding in MBSFN subframes. Therefore, UE before Rel-10 is requested for upgrade so that they can tray decoding in MBSFN subframes.

In order to transmit/receive unicast data, LTE systems inform PDCCH where transmission/reception of real data is performed. PDSCH transmits real data. Before the UE receives real data, the UE needs to determine whether it has information about resources that PDCCH has allocated to the UE.

On the contrary, MBSFN obtains information about resource assignment through a relatively more complicated process. First of all, eNB informs UE of transmission location of Multicast Control Channel (MCCH) according to MBSFN areas provided by a cell, through broadcast information of SIB13. MCCH includes resource assignment information for MBSFN. UE decodes MCCH and detects transmission location of MBSFN subframes.

As describe above, MBMS provides resource assignment information though the method that differs from unicast according to the related art. Therefore, MBMS can provide information to UE operating in idle mode. MBSM informs UE of MCCH transmission location through broadcast information of SIB 13. The entire process of receiving an MBMS service as described below referring to FIG. 17.

Figure 17:
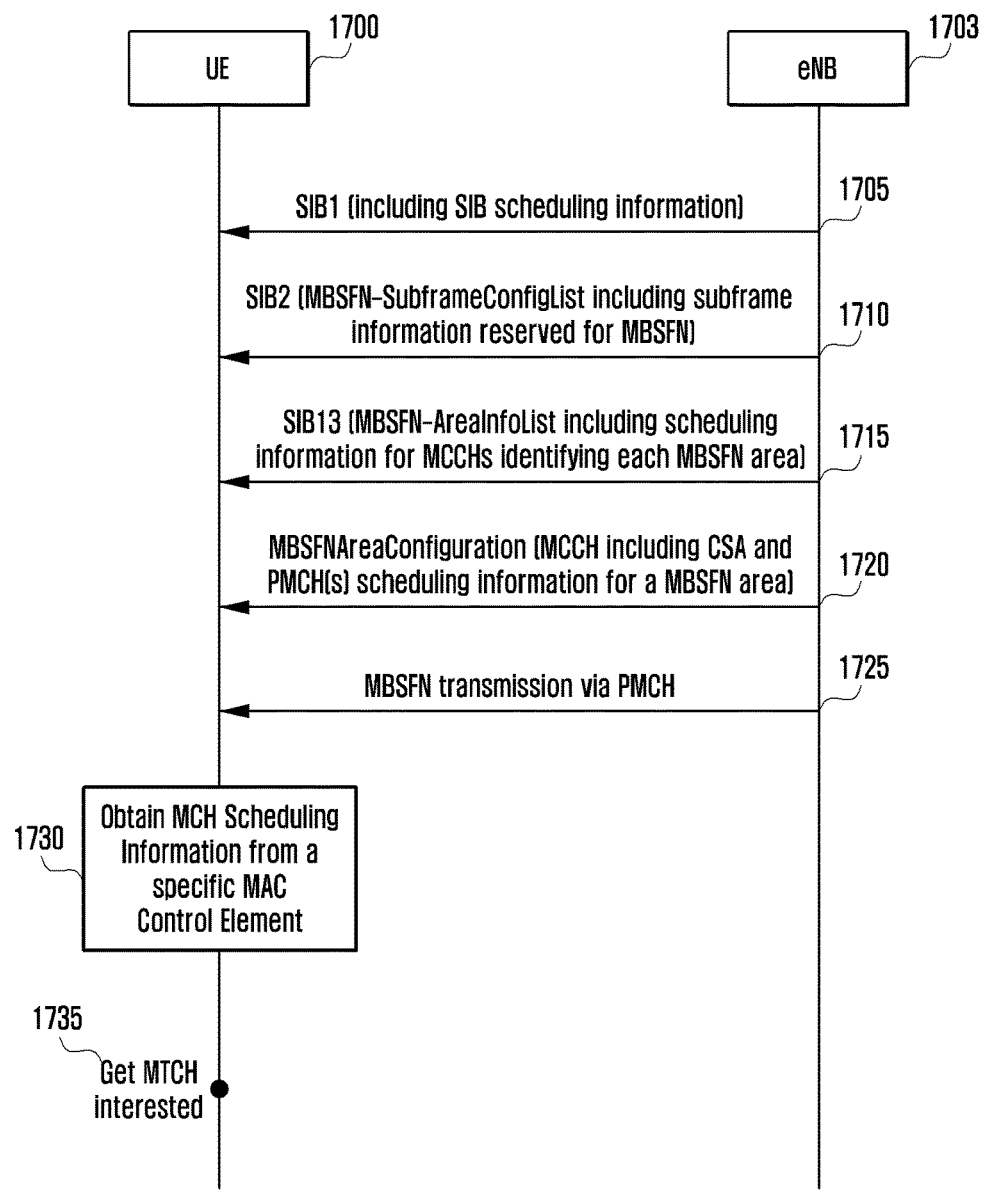
FIG. 17 is a flow chart that describes a method of receiving MBSFN by UE according to an embodiment of the present disclosure.

FIG. 17 is a flow chart that describes a method of receiving MBSFN by UE according to an embodiment of the present disclosure.

Referring to FIG. 17, UE 1700 receives SIB1 from eNB 1703 at operation 1705. The SIB1 includes scheduling information about other SIBs. Therefore, UE 1700 needs to have received SIB 1 in order to receive other SIBs. UE 1700 receives SIB2 from eNB 1703 at operation 1710. MBSFN subframe configuration list of SIB2, MBSFN-Subframe-ConfigList IE, indicates subframes available for MBSFN transmission. MBSFN-SubframeConfigList IE includes MBSFN-SubframeConfig IE, indicating which subframe of which radio frames can be MBSFN subframe. The following table 3 shows the structure of MBSFN-SubframeConfig IE.

TABLE 3

MBSFN-SubframeConfig information element

```
-- ASN1START
MBSFN-SubframeConfig ::=    SEQUENCE {
radioframeAllocationPeriod      ENUMERATED {n1, n2, n4, n8, n16,
                                n32},
radioframeAllocationOffset      INTEGER (0..7),
subframeAllocation              CHOICE {
oneFrame                        BIT STRING (SIZE(6)),
fourFrames                      BIT STRING (SIZE(24))
}
}
-- ASN1STOP
```

In Table 3, the radio frame allocation period, radioFrameAllocationPeriod, and radio frame allocation offset, radioFrameAllocationOffset, are used to indicate radio frames with MBSFN subframes. Radio frames satisfying a numerical formula, SFN mod radioFrameAllocationPeriod=radioFrameAllocationOffset, have MBSFN subframes.

System Frame Number (SFN) is used for numbering radio frames from 0 to 1023, where the numbering is repeated. The subframe allocation, subframeAllocation, indicates which subframe of radio frames indicated by the numerical formula is MBSFN subframe. The subframe allocation makes an indication by unit of one radio frame or unit of four radio frames. When the subframe allocation makes an indication by unit of one radio frame, it is indicated by oneFrame IE. MBSFN subframes may be in the $1^{st}$, $2^{nd}$, $3^{rd}$, $6^{th}$, $7^{th}$ and $8^{th}$ subframes of the 10 subframes in total in one radio frame. Therefore, the oneFrame IE indicates MBSFN subframe from the listed subframes by using 6 bits. When the subframe allocation makes an indication by unit of four radio frames, it is indicated by fourFrames IE. In order to cover four radio frames, the fourFrames IE indicates MBSFN subframes in the listed subframes, every radio frame, by using 24 bits in total. Therefore, UE can correctly detect MBSFN subframes from the subframes by using MBSFN-SubframeConfigList IE.

If UE 1700 wants to receive MBSFN, it receives SIB13 from the eNB 1703 at operation 1715. MBSFN area information list, MBSFN-AreaInfoList IE, of SIB13 includes information about location where MCCH by MBSFN areas provided by a cell is transmitted. UE receives MCCH using the information at operation 1720. The following table 4 shows MBSFN-AreaInfoList IE. Every MBSFN area includes corresponding MCCH. MBDFN-AreaInfoList IE includes MCCH scheduling information of all MBSFN areas. MBSFN-AreaInfo IE includes MCCH scheduling and corresponding information. Mbsfn-AreaId is MBSFN area Identifier (ID). Non-MBSFNregionLength denotes the number of symbols corresponding to a non-MBSFN area from the symbols in MBFSN subframes. The symbol is located in the head part of the subframe. notificationIndicator is used to indicate PDCCH bit informing UE of the change of MCCH information. Mcch-Config IE includes MCCH scheduling information. Mcch-RepetitionPeriod and mcch-Offset are used to indicate a location of a frame including MCCH. Mcch-ModificationPeriod is a transmission period of MCCH. sf-AllocInfo indicates a location of a subframe including MCCh in a subframe including the MCCH. signallingMCS denotes a subframe indicated by sf-AllocInfo and a Modulation and Coding Scheme (MCS) applied to (P)MCH.

TABLE 4

MBSFN-AreaInfoList information element

```
-- ASN1START
MBSFN-AreaInfoList-r9 ::=    SEQUENCE (SIZE(1..maxMBSFN-
MBSFN-AreaInfo-r9               Area)) OF
MBSFN-AreaInfo-r9 ::=        SEQUENCE {
  mbsfn-AreaId-r9              INTEGER (0..255),
  non-MBSFNregionLength        ENUMERATED {s1, s2},
  notificationIndicator-r9     INTEGER (0..7),
  mcch-Config-r9               SEQUENCE {
    mcch-RepetitionPeriod-r9     ENUMERATED {rf32, rf64, rf128,
                                 rf256},
    mcch-Offset-r9               INTEGER (0..10),
    mcch-ModificationPeriod-r9   ENUMERATED {rf512 , rf1024},
    sf-AllocInfo-r9              BIT STRING (SIZE(6)),
    signallingMCS-r9             ENUMERATED {n2, n7, n13, n19}
  },
  ...
}
```

MBSFN area configuration, MBSFNAreaConfiguration IE, of MCCH indicates a location of a resource used for MBSFN transmission. UE receives MBSFN subframes using the location information at operation 1725. commonSF-Alloc is subframes allocated to an MBSFN area. commonSF-AllocPeriod is a period of subframes indicated by the commonSF-Alloc. Pmch-InfoList IE includes all PMCH configuration information about one MBSFN area.

TABLE 5

MBSFNAreaConfiguration message

```
-- ASN1START
MBSFNAreaConfiguration-r9 ::=   SEQUENCE {
commonSF-Alloc-r9               CommonSF-AllocPatternList-r9,
commonSF-AllocPeriod-r9         ENUMERATED {
rf4, rf8, rf16, rf32, rf64, rf128, rf256},
pmch-InfoList-r9                PMCH-InfoList-r9,
nonCriticalExtension            MBSFNAreaConfiguration-v930-IEs    OPTIONAL
}
MBSFNAreaConfiguration-v930-IEs ::= SEQUENCE {
lateNonCriticalExtension        OCTET STRING                       OPTIONAL, --
  Need OP
nonCriticalExtension            SEQUENCE { }                       OPTIONAL --
  Need OP
}
```

TABLE 5-continued

MBSFNAreaConfiguration message

CommonSF-AllocPatternList-r9 ::= SEQUENCE (SIZE (1..maxMBSFN-Allocation
s)) OF MBSFN-SubframeConfig
-- ASN1STOP UE obtains a location of MBSFN subframe transmitting MTCH of interest from MCH scheduling information MAC CE which is one of the MAC Control Element (CE) of the received MAC PDU at operation 1730. UE decodes the MTCH of interest using MCH scheduling information at operation 1735.

Figure 18:
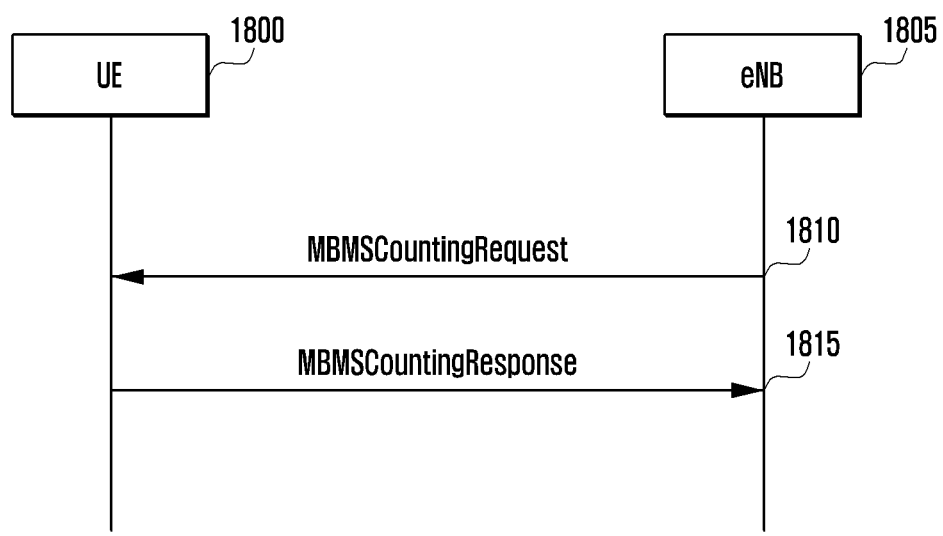
FIG. 18 is a signal flow chart that describes an MBMS counting procedure according to an embodiment of the present disclosure.

FIG. 18 is a signal flow chart that describes an MBMS counting procedure according to an embodiment of the present disclosure.

Referring to FIG. 18, the MBMS counting procedure allows eNB to detect MBMS service of interest or MBMS services that UE operating in connection mode is receiving. The eNB 1805 transmits a message, MBMScountingRequest, to the UE 1800 at operation 1810. The MBMScountingRequest message is used to count the number of UE devices that are receiving a specific MBMS service that have an interest in the MBMS service. The message includes Temporary Mobile Group Identity (TMGI) IE. TMGI includes Public Land Mobile Network (PLMN) ID and service ID and is used to indicate a specific MBMS service. The eNB may inform the UE, by using TMGI, of a detail about what types of MBMS services it wants to collect. The UE informs the eNB, by using MBMScountingResponse, of a detail as to whether the UE is receiving or has an interest in services that the eNB wants to collect at operation 1815. The eNB may determine, based on the received collected information, whether it continues broadcasting the current MBMS service or broadcasts a new service.

The MBMS counting procedure has a limitation that it can only collect information from UE operating in connection mode. In LTE standards, MBMS services may be received by UE in idle mode as well as in connection mode. Therefore, in order to measure the correct demand for MBMS services and to determine real services to be broadcast, MBMS services received by UE in idle mode need to be collected, in addition to MBMS services received by UE in connection mode. However, when UE in idle mode reports the information described above to eNB, it needs to tray connecting to the eNB. The present disclosure provides a method of effectively reporting, by UE in idle mode, the information described above to eNB.

In embodiment 6 of the present disclosure, when eNB requests a MBMS counting procedure from UE in idle mode by using SIB or MCCH, the UE switches to connection mode and provides the information described above to the eNB. During the process, the UE ignores the current network congestion and switches to connection mode. To this end, during the RRC connection establishment, the UE defines a new cause value indicating that connection is made with MBMS counting-related information in the RRC Connection Request message.

Figure 19:
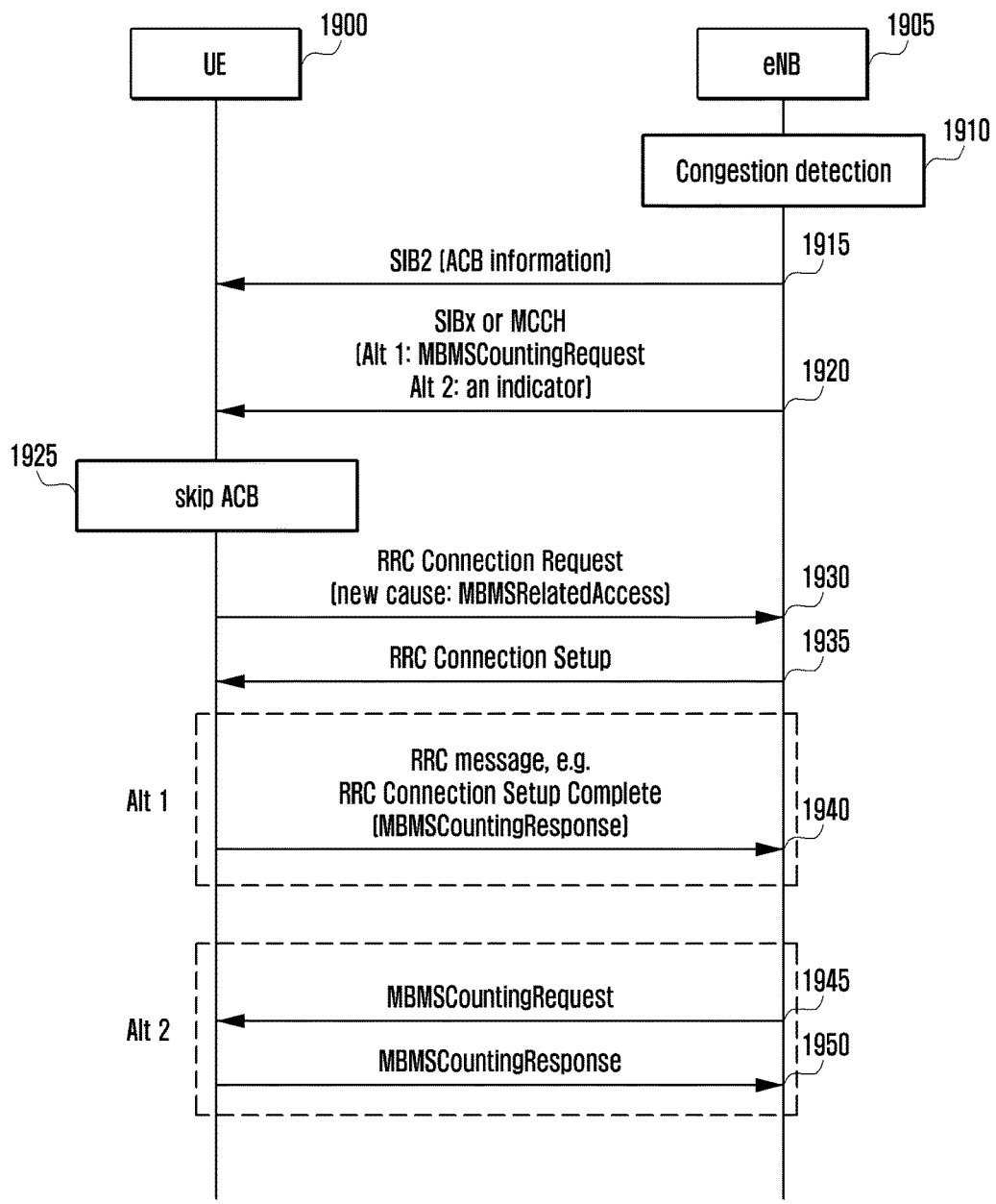
FIG. 19 is a signal flow chart that describes a method of reporting MBMS counting information to eNB by UE in idle mode according to a sixth embodiment of the present disclosure.

FIG. 19 is a signal flow chart that describes a method of reporting MBMS counting information to eNB by UE in idle mode according to a sixth embodiment of the present disclosure.

Referring to FIG. 19, the eNB 1905 detects network congestion at operation 1910. In order to control network congestion, the eNB may limit an access attempt by the UE 1900 by using a broadcast control channel at operation 1915. When the network is congested as the number of network users increases, the eNB limits new access attempts by UE in idle mode in order to maintain quality of service. UE that needs to connect to the eNB determines whether it is allowed for the access by using specific configuration information provided to the UE. The specific configuration information is referred to as ACB. ACB is included in SIB2 of SIB that eNB broadcast to provide system information to UE devices in the cell. The eNB may request a report of MBMS counting information from UE devices in idle mode by using SIB or MCCH at operation 1920. UE devices in idle mode, i.e., not in connection mode, may receive SIB or MCCH broadcast. Therefore, the request may be included in an existing SIB or a new SIB. The request may also be included in an MCCH, or an MBMS control channel. The information to be included in the SIB or MCCH may be configuration information included in MBMS Counting Request message (Alt 1). In that case, UE that has switched to connection mode may directly report MBMS counting information to eNB without a request message from the eNB. Although this method does not need a request message from eNB, it is disadvantageous in that SIB or MCCH has to include a relatively great deal amount of information. As another method, only one indicator for requesting a report may be included in SIB or MCCH (Alt 2). In that case, UE in idle mode receives the indicator and switches to connection mode. After that, UE receives an MBMS Counting Request message from eNB and then reports counting information about a specific MBMS service indicated by the message to the eNB. This method is advantageous in that it may use at least the exiting MBMS counting information and minimize the amount of information to be included in SIB or MCCH. After UE devices in idle mode receive the request and switch to connection mode, they need to report the MBMS counting information to the eNB. However, if the UE does not immediately connect to the eNB because of ACB, it may not report the information to the eNB. Since MBMS counting is used to determine whether the eNB continues providing the current MBMS service or provides a new service, etc., it need to be reported to the eNB in time. That is, MBMS counting has a higher order of priority than other Access. However, if UE devices that need to report the information to eNB cannot be connected to the eNB due to ACB, the eNB may not obtain information required to manage MBMS services in time. In order to prevent this problem, according to the present disclosure, UE devices in idle mode that need to report MBMS counting information ignores the ACB at operation 1925 and attempts an access. In particular, a new cause value is defined in an RRC Connection Request message and indicated to eNB at operation 1930. The RRC Connection Request message is the first RRC message that UE transmits to eNB when the UE needs an access to the eNB. The message includes cause values indicating the access objectives of UE to eNB. In LTE standards, the cause values are defined as follows.

Emergency: Emergency-related access
    highPriorityAccess: access for specific objective mt-Access: access according to paging mo-Signaling: UE signaling access for signal transmission mo-Data: UE signaling access for data transmission delayTolerantAccess: access with tolerant delay and low order of priority (primarily applied to MTC devices)

In addition, in the present disclosure, a new cause value, MBMSRelatedAccess, is defined. When the cause value is included in an RRC Connection Request message, the eNB concludes that the UE has attempted an access to report MBMS counting information. The UE receives an RRC Connection Setup message from the eNB at operation 1935. The UE reports the MBMS counting information to the eNB by using a specific RRC message. An example of the specific RRC message may be RRC Connection Request or RRC Connection Setup Complete. A new RRC message may also be defined. When UE has already obtained configuration information related to the reporting of MBMS counting information through SIB or MCCH, it may report MBMS counting information to the eNB by using an existing RRC message or a new RRC message at operation 1940. On the contrary, when UE has received an indicator that switches the idle mode to connection mode to report MBMS counting information, through SIB or MCCH, it may report MBMS counting information to the eNB through an existing MBMS counting procedure at operations 1940 and 1945.

Figure 20:
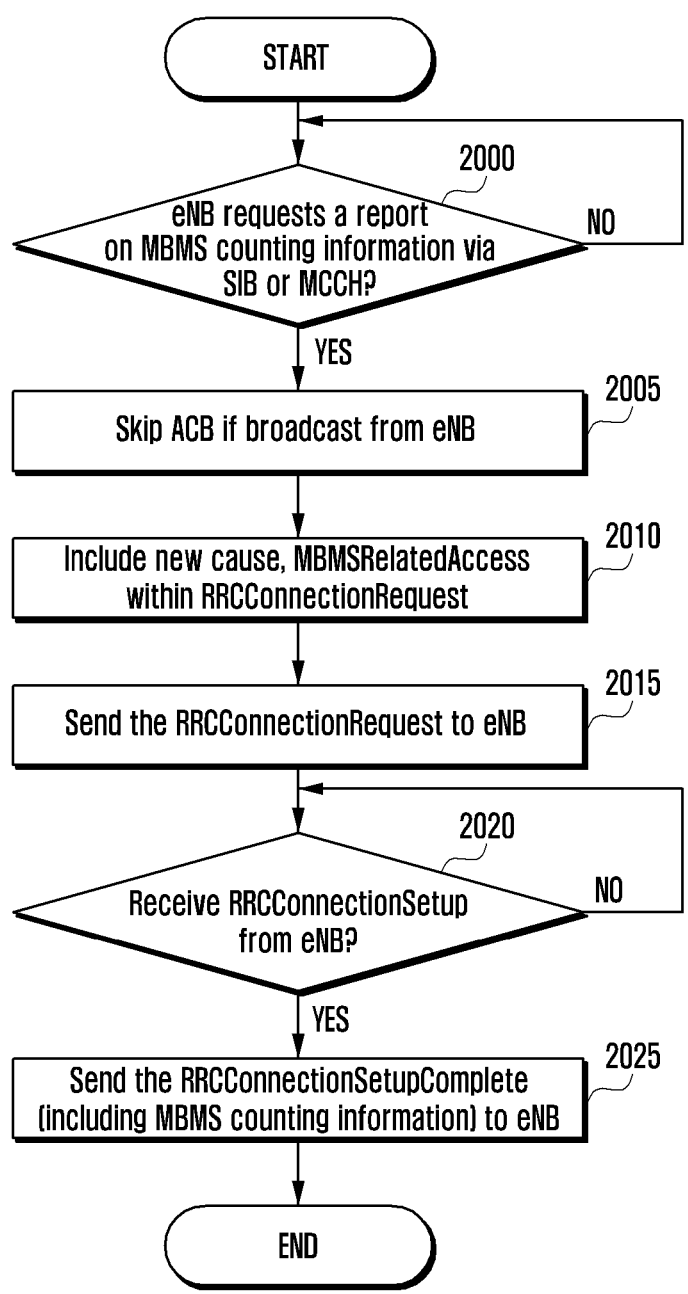
FIG. 20 is a flow chart that describes operations of UE according to a sixth embodiment of the present disclosure.

FIG. 20 is a flow chart that describes operations of UE according to a sixth embodiment of the present disclosure.

Referring to FIG. 20, UE in idle mode receives, from eNB, a request to report MBMS counting-related information to eNB through SIB or MCCH at operation 2000. The request may also include MBMS counting configuration information, according to the alternative. In order to report the MBMS counting information, the UE needs to switch from the idle mode to connection mode. To this end, the UE triggers access and also ignores ACB if the ACB has been broadcast from the eNB at operation 2005. That is, the UE does not determine whether the triggered access is allowed by using ACB information, but instead ascertains that the access has been allowed. UE creates an RRC Connection Request message and select MBMSRelatedAccess with cause IE at operation 2010. The cause value informs the eNB that the access is to report MBMS counting information. The UE reports the RRC Connection Request message to the eNB at operation 2015. The UE waits for an RRC Connection Setup message from the eNB at operation 2020. When the UE has successfully received an RRC Connection Setup message in operation 2020, it includes MBMS counting information in an RRC Connection Setup Complete and reports it to the eNB at operation 2025. MBMS counting information may be included in other RRC messages. For example, MBMS counting information may be included in an RRC Connection Request message or may be defined as a new RRC message. The procedure was described based on Alternative 1. When the procedure is performed according to Alternative 2, the existing MBMS counting procedure is used after RRC Connection Establishment.

Embodiment 7

Embodiment 7 provides a method of collecting MBMS counting information by using a Random Access. The method surveys not an accurate demand for a specific MBMS service by using a specific RRC message, but a demand for a specific MBMS service by detecting the reception power/energy of preamble receiving power or energy for a preamble. Although the method cannot detect a correct value for a demand for a specific MBMS service, it is advantageous because it can obtain a demand for a specific MBMS service through a simple procedure. In particular, since embodiment 1 needs an RRC connection, the method can reduce load over the entire network when network congestion occurs. Embodiment 2 can detect a demand for a specific MBMS service without making network congestion worse.

Figure 21:
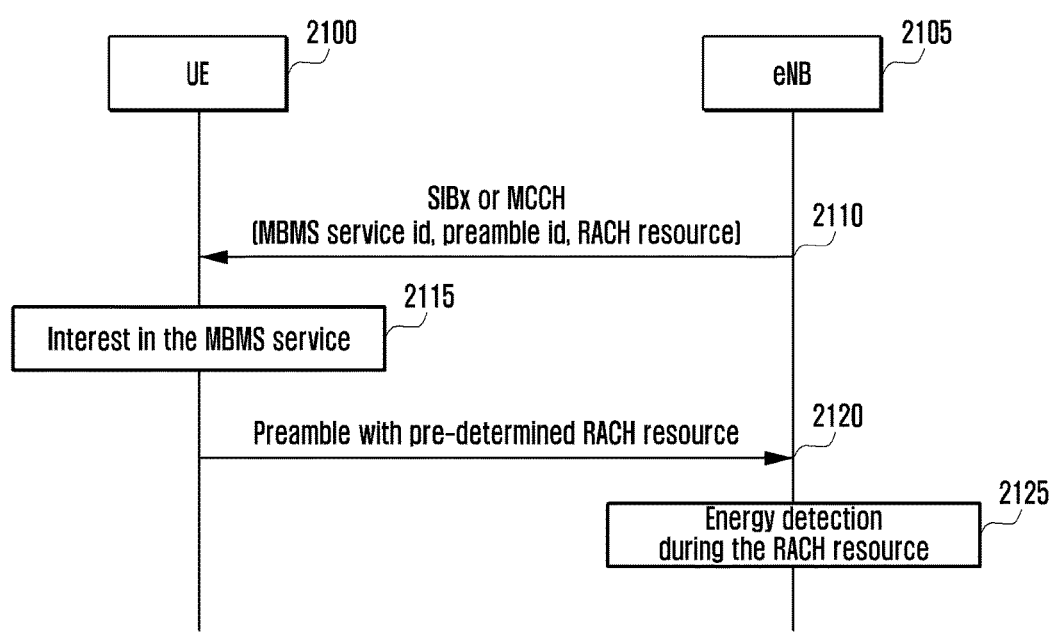
FIG. 21 is a signal flow chart that describes a method of reporting MBMS counting information to eNB by UE in idle mode according to a seventh embodiment of the present disclosure.

FIG. 21 is a signal flow chart that describes a method of reporting MBMS counting information to eNB by UE in idle mode, according to a seventh embodiment of the present disclosure. FIG. 21 is a signal flow chart that describes a method of reporting MBMS counting information to eNB by UE in idle mode, according to embodiment 2 of the present disclosure.

Referring to FIG. 21, the eNB 2105 broadcasts configuration information to collect MBMS counting information to the UE 2100 by using SIB or MCCH at operation 2110. In Embodiment 2, the configuration information includes at least one of the following: MBMS service ID, preamble ID, and Random Access CHannel (RACH) resource. Although the configuration information may include a plurality of the following: MBMS service ID, preamble ID, and RACH resource, one MBMS service ID needs to correspond to one preamble ID and RACH resource. The preamble is a reserved preamble used for contention free RACH, in handover, etc. RACH resources are radio resources on frequency and time domain. In radio resource indicated by the RACH resource, UE may transmit a preamble indicated by the preamble id. If the UE in idle mode is receiving or has an interest in a MBMS service of which ID is identical to the MBMS service ID described above at operation 2115, the UE transmits a preamble indicated by the preamble ID described above to the eNB by using the RACH resource described above at operation 2120. The eNB detects reception power/energy due to the preamble at the location of the RACH resource at operation 2125. If the reception power/energy is measured greater than a preset threshold, the eNB ascertains that one or more UE devices in idle mode have an interest in the MBMS service.

Figure 22:
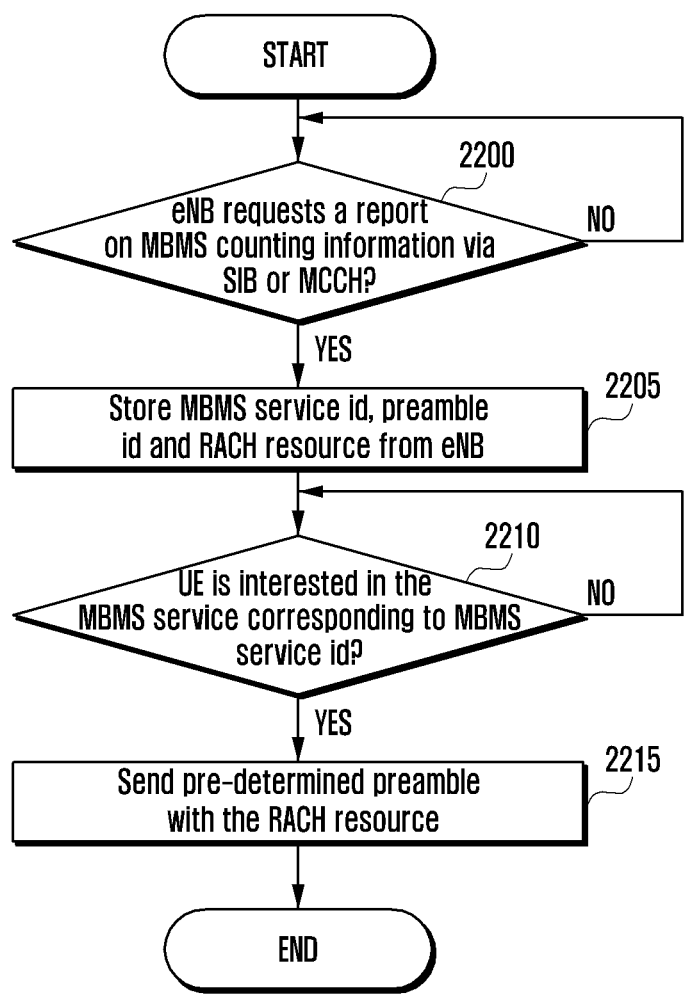
FIG. 22 is a flow chart that describes operations of UE according to a seventh embodiment of the present disclosure.

FIG. 22 is a flow chart that describes operations of UE according to a seventh embodiment of the present disclosure. FIG. 22 is a flow chart that describes operations of UE according to embodiment 2.

Referring to FIG. 22, UE in idle mode receives, from eNB, a request to report MBMS counting-related information to the eNB through SIB or MCCH at operation 2200. The information includes MBMS service id, preamble id, and RACH resource. One MBMS service ID corresponds to one preamble ID and RACH resource. The UE stores the configuration information at operation 2205. The UE determines whether the MBMS service that it is receiving or has an interest in is consistent with a MBMS service indicated by the MBMS service ID at operation 2210. When the UE ascertains that the MBMS service that it is receiving or has an interest in is consistent with a MBMS service indicated by the MBMS service ID in operation 2210, it transmits a preamble, indicated by a preamble ID corresponding to the MBMS service id, to the eNB by using a radio resource indicated by the corresponding RACH resource at operation 2215. The eNB measures an increase in reception power/energy due to the preamble in the RACH resource. When the eNB has measured an increase in reception power/energy, it ascertains that there is a demand for the corresponding MBMS service. The eNB may predict a demand according to the extent of increase in reception power/energy. Therefore, the eNB uses the prediction information to determine whether it continues providing the current MBMS service or provides a new MBMS service.

Figure 23:
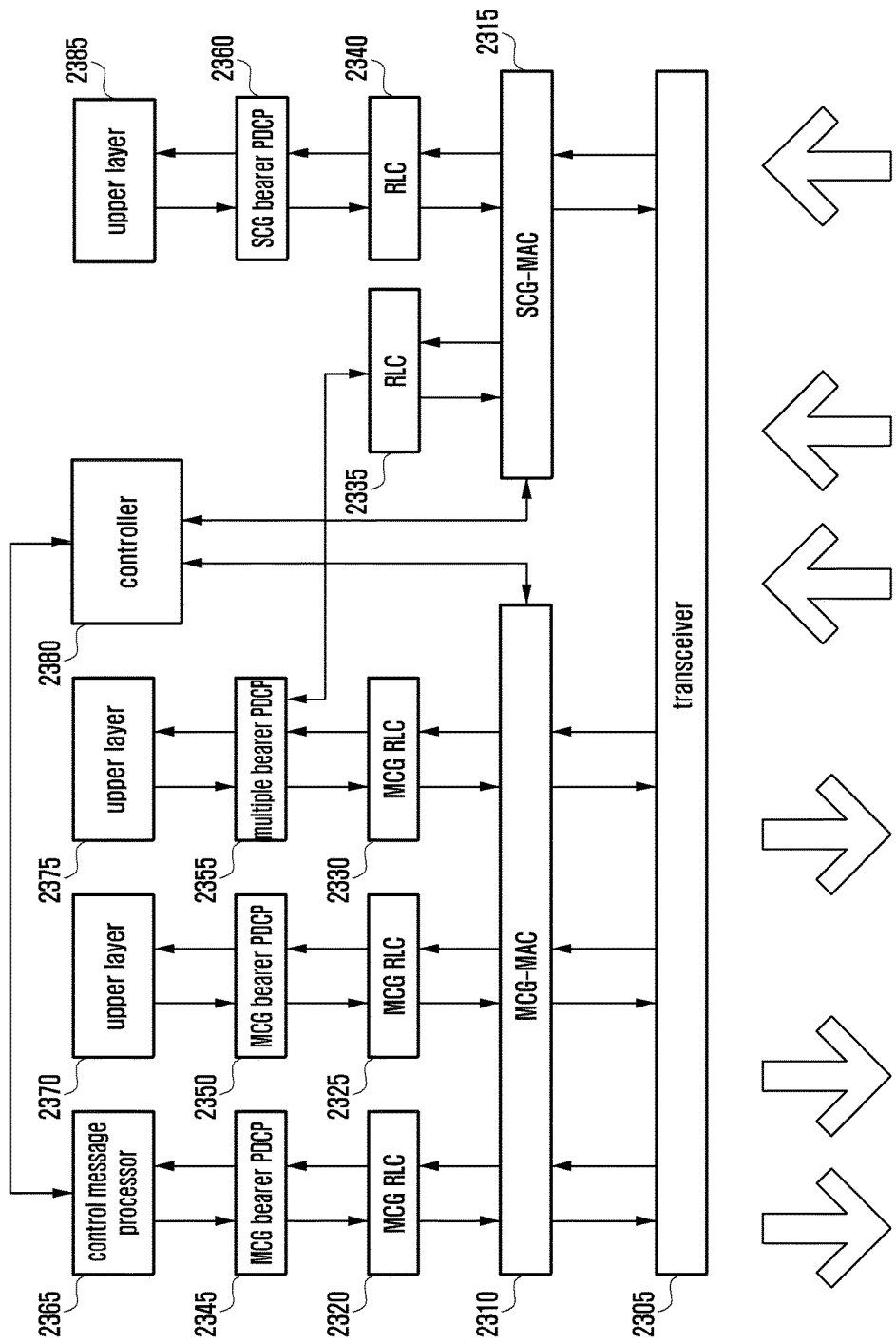
FIG. 23 is a schematic block diagram of UE according to an embodiment of the present disclosure.

FIG. 23 is a schematic block diagram of UE in an LTE system according to an embodiment of the present disclosure.

Referring to FIG. 23, the UE device includes MCG-MAC 2310, control message processor 2365, upper layer processors 2370, 2375, and 2385, controller 2380, SCG-MAC 2315, MCG-MAC 2310, transceiver 2305, PDCP 2345, 2350, 2355 and 2360, RLC 2320, 2325, 2330, 2335, and 2340.

The transceiver 2305 receives data and control signals through downlink channel of a serving cell and transmits data and control signals through uplink channel. When a plurality of serving cells are configured, the transceiver 2305 transmits/receives data and control signals to/from the serving cells.

The MCG-MAC 2310 multiplexes data created in the RLCs. The MCG-MAC 2310 also de-multiplexes data transferred from the transceiver 2305 and transfers the de-multiplexed data to corresponding RLCs. The MCG-MAC 2310 processes Buffer Status Report (BSR), Power Headroom Report (PHR), etc., triggered with MCG.

The control message processor 2365 is an RRC layer device. The control message processor 2365 processes control messages from the eNB, and performs corresponding operations. For example, the control message processor 2365 receives an RRC control message and transfers configuration information to the controller 2380.

The upper layer processors are configured according to types of services. The upper layer processors process data created in user services, such as FTP, VoIP, etc. and transfer the processed data to the PDCP.

The controller 2380 detects scheduling commands received via the transceiver 2305, e.g., reverse grants, and controls the transceiver 2305 and the Multiplexer-De-Multiplexer to perform the reverse transmission through proper transmission resources in time. As described above referring to FIGS. 6 to 22, the controller 2380 controls the operations of the UE. Although the embodiment of the present disclosure is implemented in such a way that the controller 2380 is separate from the PDCP, it may be modified in such a way that part of the functions of the controller 2380 may be integrated into the PDCP.

In addition, although the embodiment of the present disclosure is implemented in such a way that the MCG-MAC 2310, control message processor 2365, upper layer processors 2370, 2375, and 2385, controller 2380, SCG-MAC 2315, MCG-MAC 2310, transceiver 2305, PDCP 2345, 2350, 2355 and 2360, RLC 2320, 2325, 2330, 2335, and 2340 are separately configured and they perform functions that differ from each other, it should be understood that the present disclosure is not limited to the embodiment. For example, it may be modified in such a way that at least two of the following: the MCG-MAC 2310, control message processor 2365, upper layer processors 2370, 2375, and 2385, controller 2380, SCG-MAC 2315, MCG-MAC 2310, transceiver 2305, PDCP 2345, 2350, 2355 and 2360, RLC 2320, 2325, 2330, 2335, and 2340 are integrated as one block.

In the following description, the configuration of an eNB in an LTE system according to the present disclosure is explained in detail referring to FIG. 24.

Figure 24:
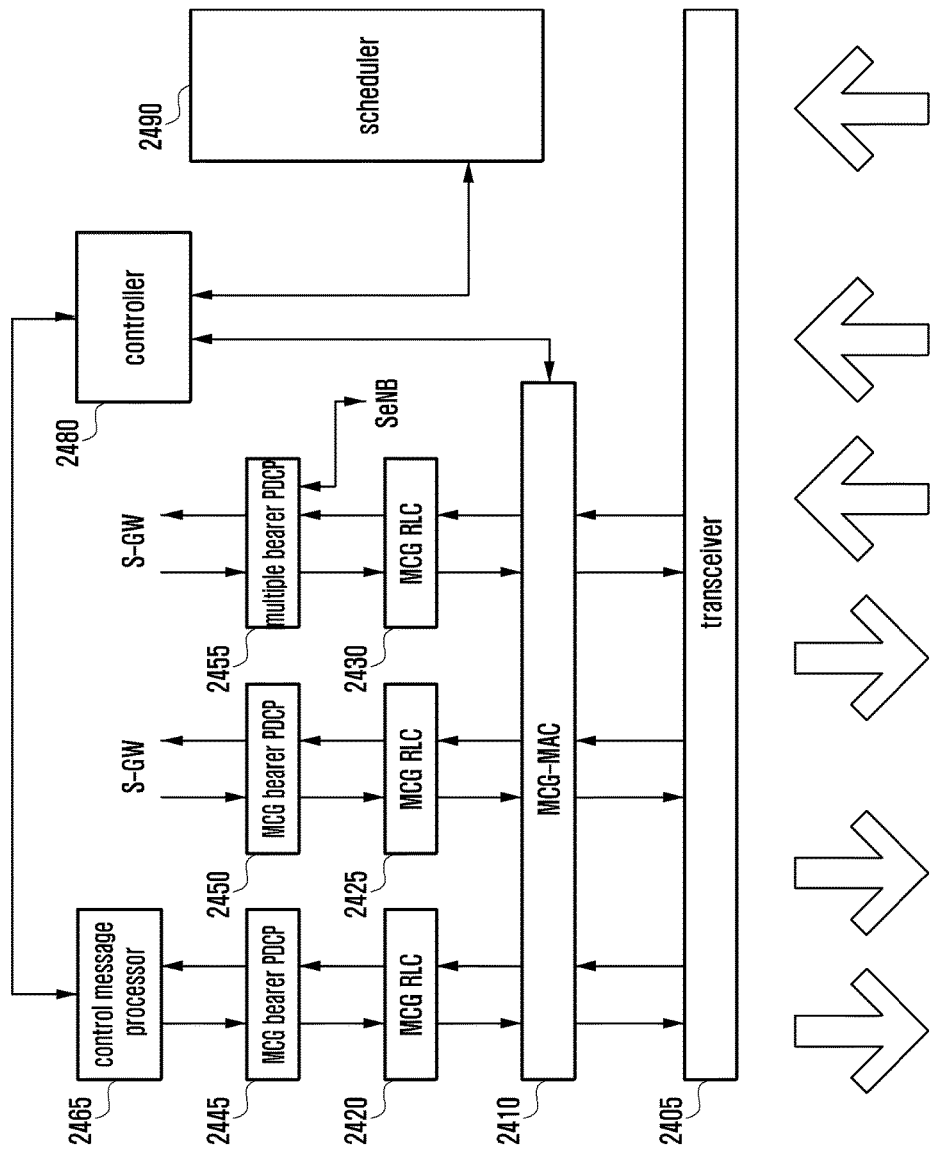
FIG. 24 is a schematic block diagram of eNB according to an embodiment of the present disclosure.

FIG. 24 is a schematic block diagram of eNB in an LTE system according to an embodiment of the present disclosure.

Referring to FIG. 24, the eNB includes MAC 2410, control message processor 2465, controller 2480, transceiver 2405, PDCP 2445, 2450, and 2455, RLC 2420, 2425, 2430, and scheduler 2490.

The transceiver 2405 transmits data and control signals through forward carriers and receives data and control signals through reverse carriers. When a plurality of carriers are configured, the transceiver 2405 transmits/receives data and control signals through the carriers.

The MCG 2410 multiplexes data created in the RLCs. The MCG 2410 also de-multiplexes data transferred from the transceiver 2405 and transfers the de-multiplexed data to corresponding RLCs or the controller 2480. The control message processor 2465 processes control messages from UE and performs corresponding operations. The control message processor 2465 creates control messages to be transmitted to UE and transfers them to the lower layers.

The scheduler 2490 allocates transmission resources to UE at a proper time, considering a buffer status of UE, a channel state, etc., and allows the transceiver 2405 to process signals from the UE or to transmit signals to the UE. The PDCPs are divided into MCG bearer PDCPs 2445 and 2450 and a multiple bearer PDCP 2455. The MCG bearer PDCPs transmit/receive data through only MCG. One MCG bearer PDCP is connected to one RLC. The multiple bearer PDCP transmits/receives data through MCG and SCG. The controller 2480 controls operations of MeNB from among the operations described above referring to FIGS. 6 to 22.

Although the embodiment of the present disclosure is implemented in such a way that the MAC 2410, control message processor 2465, controller 2480, transceiver 2405, PDCP 2445, 2450, and 2455, RLC 2420, 2425, 2430, and scheduler 2490 are separately configured and they perform functions that differ from each other, it should be understood that the present disclosure is not limited to the embodiment. For example, it may be modified in such a way that at least two of the following: the MAC 2410, control message processor 2465, controller 2480, transceiver 2405, PDCP 2445, 2450, and 2455, RLC 2420, 2425, 2430, and scheduler 2490 are integrated as one block.

As described above, according to various embodiments of the present disclosure, the apparatus and method can aggregate a plurality of carries between eNBs and perform transmission/reception of signals in a mobile communication system supporting a plurality of carriers.

In addition, the apparatus and method according to various embodiments of the present disclosure aggregates a plurality of carriers between eNBs and performs transmission/reception of signals in a mobile communication system supporting a plurality of carriers, thereby enhancing a signal transmission/reception rate of UE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for configuring a connection by a terminal, the method comprising:
   receiving a radio resource control (RRC) message from a base station;
   determining that semi-persistent scheduling (SPS) and transmission time interval (TTI) bundling are simultaneously to be configured based on the RRC message;

when the SPS and the TTI bundling are simultaneously to be configured, determining that dual connectivity is to be configured;
when the dual connectivity is to be configured, determining that the TTI bundling is to be configured for a primary serving cell (PCell) of a master cell group (MCG) and the SPS is to be configured for a primary secondary serving cell (PSCell) of a secondary cell group (SCG); and
when the TTI bundling is to be configured for the PCell of the MCG and the SPS is to be configured for the PSCell of the SCG, configuring an RRC connection based on the RRC message.

2. The method of claim 1, wherein the RRC message comprises an RRCConnectionReconfiguration message.

3. The method of claim 1, further comprising:
when at least one of the SPS or the TTI bundling is not to be configured, configuring the RRC connection based on the RRC message.

4. The method of claim 1, further comprising:
when the SPS and the TTI bundling are simultaneously to be configured, determining whether a number of configured uplinks in the MCG is one; and
when the number of configured uplinks in the MCG is more than one, ignoring the RRC message and initiating an RRC connection reestablishment procedure.

5. The method of claim 1, further comprising:
when the dual connectivity is not to be configured, ignoring the RRC message and initiating an RRC connection reestablishment procedure.

6. A terminal for configuring a connection, the terminal comprising:
a transceiver configured to at least one of transmit or receive a signal; and
a controller coupled with the transceiver and configured to:
receive a radio resource control (RRC) message from a base station,
determine whether semi-persistent scheduling (SPS) and transmission time interval (TTI) bundling are simultaneously to be configured based on the RRC message,
if the SPS and the TTI bundling are simultaneously to be configured, determine whether dual connectivity is to be configured,
if the dual connectivity is to be configured, determine whether the TTI bundling is to be configured for a primary serving cell (PCell) of a master cell group (MCG) and the SPS is to be configured for a primary secondary serving cell (PSCell) of a secondary cell group (SCG), and
if the TTI bundling is to be configured for the PCell of the MCG and the SPS is to be configured for the PSCell of the SCG, configure an RRC connection based on the RRC message.

7. The terminal of claim 6, wherein the RRC message comprises an RRCConnectionReconfiguration message.

8. The terminal of claim 6, wherein the controller is further configured to:
if at least one of the SPS or the TTI bundling is not to be configured, configure the RRC connection based on the RRC message.

9. The terminal of claim 6, wherein the controller is further configured to:
if the SPS and the TTI bundling are simultaneously to be configured, determine whether a number of configured uplinks in the MCG is one, and
if the number of configured uplinks in the MCG is more than one, ignore the RRC message and initiate an RRC connection reestablishment procedure.

10. The terminal of claim 6, wherein the controller is further configured to:
if the dual connectivity is not to be configured, ignore the RRC message and initiate an RRC connection reestablishment procedure.

11. A method for configuring a connection by a base station, the method comprising:
determining that transmission time interval (TTI) bundling is to be configured for a terminal on a primary serving cell (PCell) of a master cell group (MCG);
determining that semi persistent scheduling (SPS) is to be configured for the terminal;
when the TTI bundling is to be configured for the terminal and the SPS is to be configured for the terminal, determining that the SPS is to be configured on the PCell of the MCG or a primary secondary serving cell (PSCell) of a secondary cell group (SCG);
when the SPS is to be configured on the PSCell of the SCG, generating a radio resource control (RRC) message indicating configuration of the TTI bundling on the PCell of the MCG; and
transmitting the RRC message to the terminal.

12. The method of claim 11, wherein the determining that the TTI bundling is to be configured for the terminal on the PCell comprises:
determining whether the TTI bundling is to be configured for the terminal on the PCell based on at least one of a channel status of the terminal or an available transmission power of the terminal.

13. The method of claim 11, wherein, when the SPS is to be configured on the PCell, the TTI bundling is not to be configured on the PCell.

14. A base station for configuring a connection, the base station comprising:
a transceiver configured to at least one of transmit or receive a signal; and
a controller coupled with the transceiver and configured to:
determine whether transmission time interval (TTI) bundling for a terminal is to be configured on a primary serving cell (PCell) of a master cell group (MCG),
determine whether semi persistent scheduling (SPS) is to be configured for the terminal,
if the TTI bundling is to be configured for the terminal and the SPS is to be configured for the terminal, determine whether the SPS is to be configured on the PCell of the MCG or a primary secondary serving cell (PSCell) of a secondary cell group (SCG),
if the SPS is to be configured on the PSCell of the SCG, generate a radio resource control (RRC) message indicating configuration of the TTI bundling on the PCell of the MCG, and
control to transmit the RRC message to the terminal.

15. The base station of claim 14, wherein the controller is further configured to determine whether the TTI bundling is to be configured for the terminal on the PCell based on at least one of a channel status of the terminal or an available transmission power of the terminal.

16. The base station of claim 14, wherein, if the SPS is to be configured on the PCell, the TTI bundling is not to be configured on the PCell.

* * * * *